(12) United States Patent
Carbone et al.

(10) Patent No.: US 11,214,202 B2
(45) Date of Patent: Jan. 4, 2022

(54) AUTOMATED SELF-LOADING CARGO CARRIER FOR VEHICLES

(71) Applicants: Frank Louis Carbone, Irvine, CA (US); Dominque Carbone, Irvine, CA (US)

(72) Inventors: Frank Louis Carbone, Irvine, CA (US); Dominque Carbone, Irvine, CA (US)

(*) Notice: Subject to any disclaimer, the term of this patent is extended or adjusted under 35 U.S.C. 154(b) by 0 days.

(21) Appl. No.: 17/151,619

(22) Filed: Jan. 18, 2021

(65) Prior Publication Data

US 2021/0206323 A1 Jul. 8, 2021

Related U.S. Application Data

(63) Continuation-in-part of application No. 17/053,017, filed as application No. PCT/US2019/030485 on May 4, 2019, which is a continuation of application No. 15/972,070, filed on May 4, 2018, now Pat. No. 10,286,853.

(51) Int. Cl.
| | |
|---|---|
| *B60R 9/00* | (2006.01) |
| *B60R 9/042* | (2006.01) |
| *G05D 3/10* | (2006.01) |
| *B60R 9/055* | (2006.01) |

(52) U.S. Cl.
CPC ............ *B60R 9/042* (2013.01); *B60R 9/055* (2013.01); *G05D 3/10* (2013.01)

(58) Field of Classification Search
CPC .......... B60R 9/042; B60R 9/055; B60R 9/06; G05D 3/10

USPC ................ 414/462–466; 362/487, 493, 496; 224/309, 310, 314, 315, 316, 321, 323, 224/326, 327, 328, 330, 331

See application file for complete search history.

(56) References Cited

U.S. PATENT DOCUMENTS

| 3,471,045 | A | * | 10/1969 | Panciocco | ................. B60P 1/32 414/522 |
|---|---|---|---|---|---|
| 4,375,306 | A | * | 3/1983 | Linder | ...................... B60P 3/32 108/44 |
| 4,573,731 | A | * | 3/1986 | Knaack | ................... B60R 11/06 224/404 |
| 4,685,860 | A | * | 8/1987 | McFarland | .......... A61G 3/0209 212/280 |
| 4,824,158 | A | * | 4/1989 | Peters | ....................... B60R 5/04 108/44 |
| 4,830,242 | A | * | 5/1989 | Painter | ..................... B60P 3/32 224/404 |
| 4,909,558 | A | * | 3/1990 | Roshinsky | .............. B60R 13/01 296/37.6 |

(Continued)

*Primary Examiner* — Lynn E Schwenning
(74) *Attorney, Agent, or Firm* — Jafari Law Group, Inc.

(57) ABSTRACT

The invention involves a cargo carrier for vehicles that facilitates loading and unloading of items onto an enclosure; the cargo carrier may be automated and self-loading via actuators and a motorized mechanism that may be remotely controlled. The actuators may be configured to tilt the enclosure or a component thereof and one or more motors may be configured to deploy a deployable tray housed within the enclosure, which minimizes user loading or unloading labor. Typically, on a front end of the enclosure, one or more actuators may couple the enclosure to a portion of a vehicle support structure. The deployable tray may include a tiltable mechanism to further facilitate loading or unloading.

20 Claims, 30 Drawing Sheets

(56) References Cited

U.S. PATENT DOCUMENTS

| | | | | | |
|---|---|---|---|---|---|
| 5,564,767 | A | * | 10/1996 | Strepek | B60P 1/00 |
| | | | | | 200/61.61 |
| 5,651,657 | A | * | 7/1997 | Poindexter | B60P 1/00 |
| | | | | | 187/222 |
| 5,820,190 | A | * | 10/1998 | Benner | B60P 3/14 |
| | | | | | 296/26.09 |
| 5,934,725 | A | * | 8/1999 | Bowers | B60P 3/40 |
| | | | | | 296/26.09 |
| 5,988,722 | A | * | 11/1999 | Parri | B60P 1/003 |
| | | | | | 224/403 |
| 6,077,024 | A | * | 6/2000 | Trueblood | B60P 1/003 |
| | | | | | 224/404 |
| 6,244,646 | B1 | * | 6/2001 | Wheeler, III | B60P 3/14 |
| | | | | | 296/26.01 |
| 6,666,643 | B1 | * | 12/2003 | Heynssens | B60P 1/4435 |
| | | | | | 212/180 |
| 7,309,202 | B1 | * | 12/2007 | Anderson | B60P 1/431 |
| | | | | | 108/44 |
| 8,221,048 | B2 | * | 7/2012 | Grollitsch | B60P 1/483 |
| | | | | | 414/546 |
| 8,282,254 | B2 | * | 10/2012 | Sautter | B60R 9/055 |
| | | | | | 362/496 |
| 2008/0044268 | A1 | * | 2/2008 | Heigl | B60P 1/4471 |
| | | | | | 414/462 |

\* cited by examiner

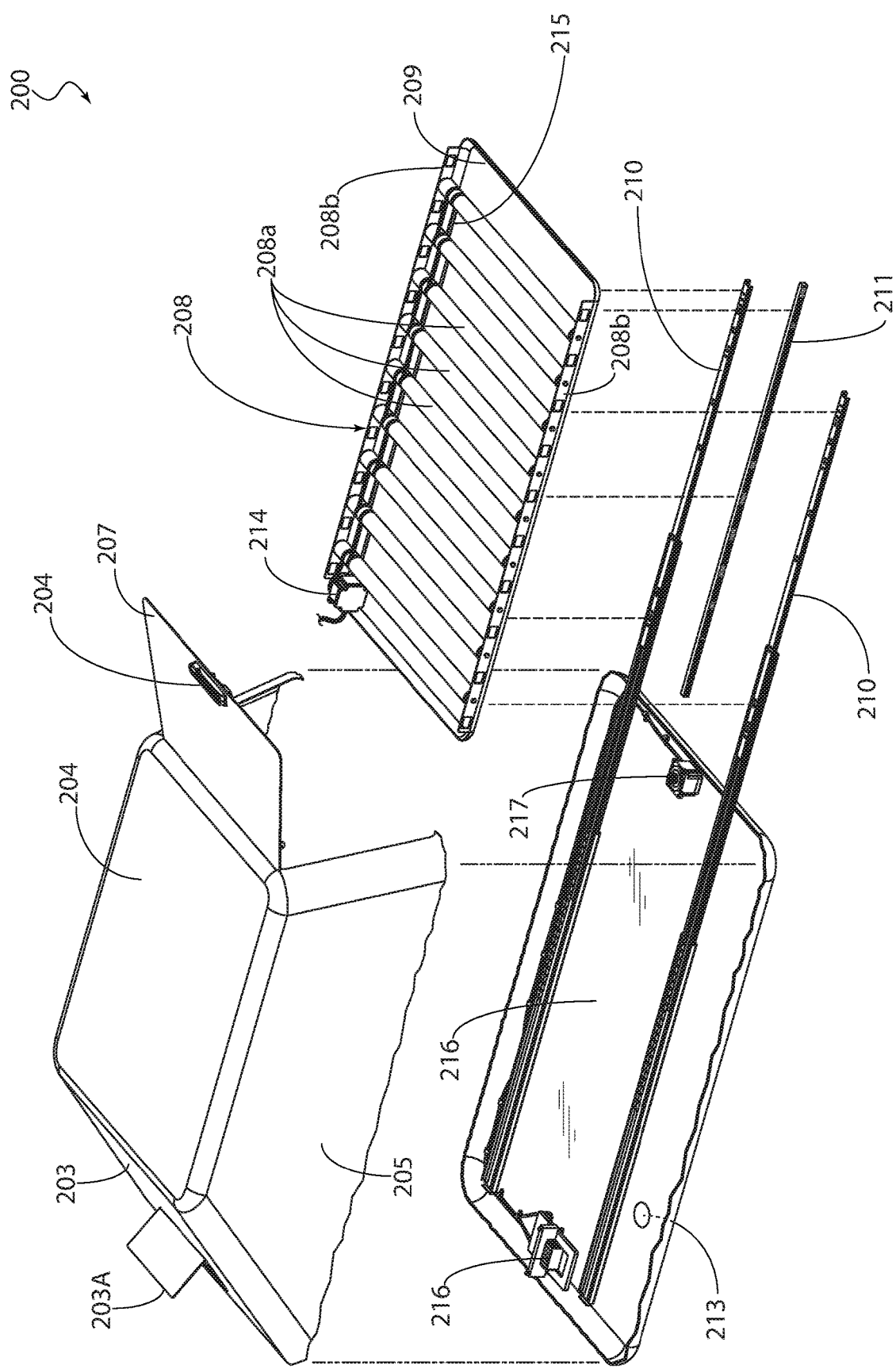

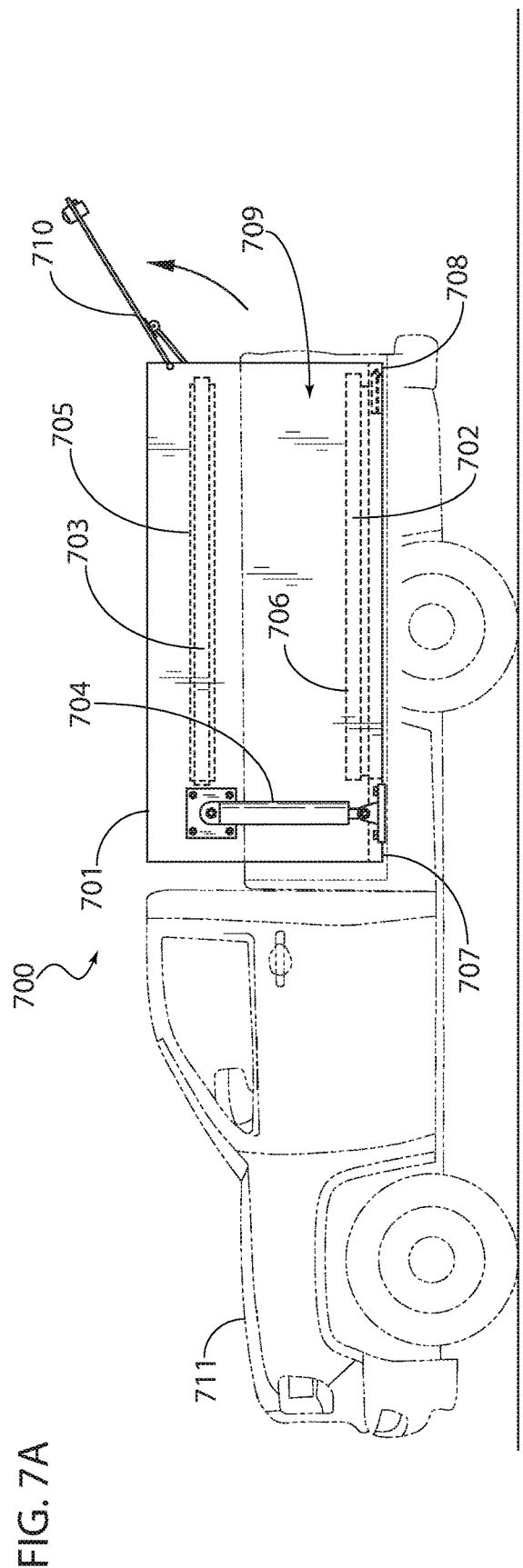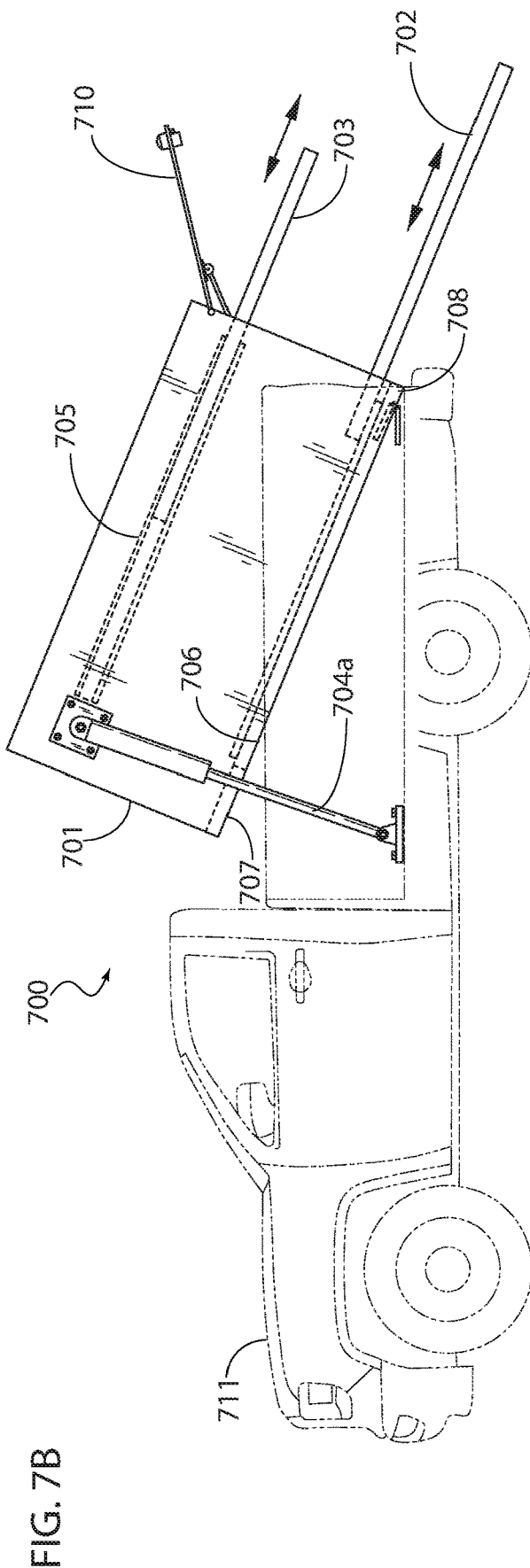

FIG. 22
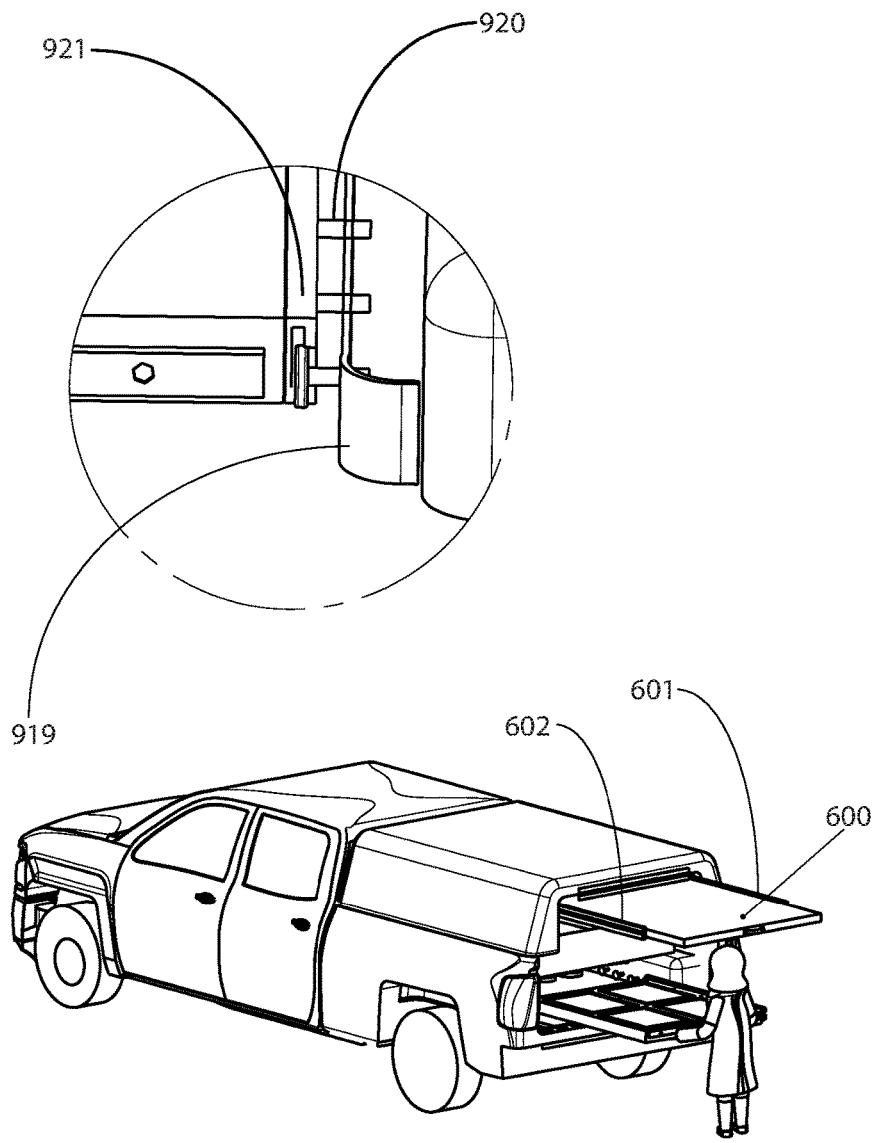
FIG. 22A
FIG. 22B
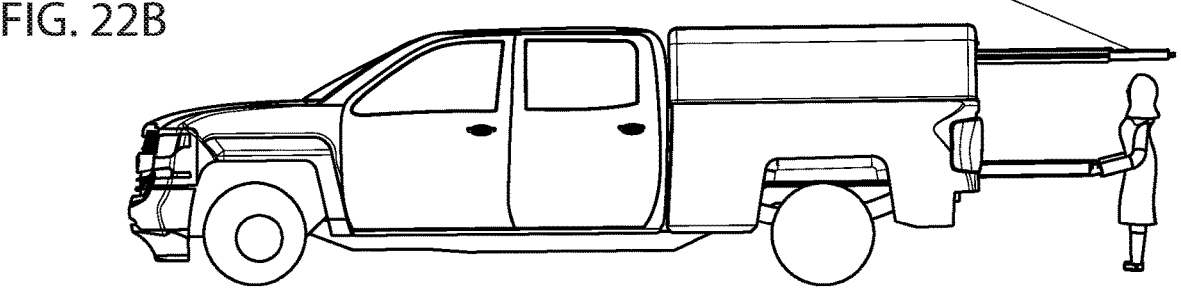

923 — Actuator Rotator Link 905
922

AUTOMATED SELF-LOADING CARGO CARRIER FOR VEHICLES

PRIORITY NOTICE

The present application is a continuation-in-part of and claims priority under 35 U.S.C. § 120 to U.S. Non-Provisional patent application Ser. No. 17/053,017, filed on Nov. 4, 2020, which is a National Phase Application of International Application No. PCT/US2019/030485, filed on May 2, 2019, which claims priority to U.S. Non-Provisional patent application Ser. No. 15/972,070, filed on May 4, 2018, the disclosure of which are incorporated herein by reference in their entirety.

TECHNICAL FIELD OF THE INVENTION

The present invention relates generally to a cargo carrier for vehicles. More specifically, the present invention relates to an automated self-loading cargo carrier for vehicles that facilitates loading and unloading of items onto an enclosure, via actuators and a motorized mechanism that may be remotely controlled.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever. Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Additional storage space for vehicles is seemingly always desirable. To these ends, numerous different storage racks, storage containers and cargo carriers have been disclosed. In fact, a variety of vehicle roof racks and storage or cargo carrying containers are currently available in the market. Moreover, the prior art is riddled with distinct types of cargo carrying means ranging from modular rack systems, to extendable racks and motorized elevators that can be attached to the rear, the roof or other parts of a vehicle. Nevertheless, despite the variety of disclosed devices, the prior art falls short of addressing several problems common to these known devices.

For example, a common obstacle is where to attach such devices (often including container or platforms for containers) on a vehicle. Sometimes these storage devices are coupled to a side of a vehicle; other times these devices are coupled to a front end or the rear end of a vehicle. Often, cargo carrying devices are coupled or affixed to the roof of a vehicle since the roof offers a wide surface area suitable for sustaining a heftier load. A persisting problem however, is that prior art devices still require a user to lift their cargo up to a platform, storage container, etc. When coupled to the roof, such required lifting may prove prohibitive to most users due to height and strength limitations; multiple users may be required for heavier loads or users may be limited in what items they may store with such devices (i.e. limited by the weight a user may be able to lift rather than the weight capacity of the device itself). While the average SUV has a roof height of 5.8" and larger vehicles may have a roof height of 6' or more, and since the device sits on top of the vehicle rack, an additional 3-4" on top of that is required to practically operate these devices without step ladders or the like. As such, many prior art devices are not used to their fullest potential due to this limitation.

One such device is taught by U.S. Pat. No. 5,348,207 to Frank. Frank describes a carrier apparatus for mounting on a roof of a vehicle. The apparatus includes a housing, magnetic mounts for connecting the housing to the vehicle and for supporting the housing in a horizontal orientation, and a drawer for sliding in and out of the housing. A pivoted connection is provided for connecting the drawer to the housing. When the drawer is retained in the horizontally oriented housing, the drawer is in the horizontal storage mode. When the drawer is pulled out from the housing and hangs down from the housing by the pivoted connection, the drawer is in the vertical access mode. Although the mounts can include a fluid suspension, lifting the cargo up into the container must be done manually, which as mentioned above significantly limits the type and weight limit of the cargo that a user will be able to load using this device.

Another device with a similar limitation is taught by U.S. Patent Publication 2017/0341590 to McLauchlan. McLauchlan describes a roof rack for a vehicle having a roof attachment means, a cargo frame adapted to releasably engage with cargo and a means to enable the cargo frame to be moved between a horizontal position above the roof of a vehicle and a vertical position behind the vehicle. In use, the roof rack is attached to the roof of a vehicle via the roof attachment means wherein a user standing behind the vehicle is able to pull the cargo frame or attached cargo towards himself such that the cargo frame and attached cargo moves from a substantially horizontal position above the roof of the vehicle to a substantially vertical position behind the vehicle so that the user can load and/or unload the cargo. Once this is done, the user can push the cargo frame or attached cargo such that the frame moves from a vertical position behind the vehicle to a horizontal position above the roof of the vehicle. Again, lifting the cargo up to the horizontal position can be difficult for most potential consumers, and as mentioned above significantly limits the type and weight limit of the cargo that a user will be able to load using this device.

Other devices address the problem of having to lift a load up to the roof by implementing a motor. One such device is taught by U.S. Patent Publication 2006/0175368 to Fallis. Fallis describes a cargo container for a vehicle including an enclosure or movable supporting member that is connected by a linkage to the vehicle. The linkage may be used to shift the enclosure between a transport position above the roof and a loading position behind the vehicle. A rearward pivoting member lifts portions of the enclosure behind the forward member upwardly to clear a rear corner of the vehicle as the enclosure is moved between the transport position and the loading position. Although this device appears to implement a motor for lifting the device between the loading position and the transport position, its use appears cumbersome and in order to facilitate the movement of the device, storage space must be substantially limited.

Limited cargo space is yet another problem that has not been adequately addressed, especially by devices that implement motorized lifting mechanisms. One such device is taught by U.S. Pat. No. 3,823,839 to Petzing. Similarly, U.S. Pat. No. 9,463,748 to Presley discloses a powered cargo rack for tall vehicles. Each of these devices fails to disclose an adequate storage space; likely due to their cumbersome lifting mechanisms that take up space otherwise suitable for cargo.

U.S. Pat. No. 5,667,116 to Reinhart forgoes the motorized feature in order to provide a more adequate cargo space, by implementing a two-part or clamshell compartment. As such, although the cargo space is increased, the implementation of clamshell compartments introduces still other setbacks.

For example, clamshells are typically long and narrow. Because of their narrow shape, most consumers install them on one side of their vehicle's roof—otherwise they are unreachable. This creates an unstable load while driving and is therefore undesirable. Moreover, these devices are designed to attach to a cross-member of an SUV's roof rack. For cars that only have longitudinal rails, like most of the newer roof racks, clamshell manufacturers sell their own cross-members and fittings to attach to the factory-installed longitudinal rails.

Newer model clamshells open and lock from either of their longitudinal sides, but the hinging and locking mechanisms, and the cargo containers themselves, are flimsy; consequently, the hinges and locks are prone to breaking, which is a common complaint amongst current clamshell owners. Current devices available on the market are also of limited volume, typically occupying less than 50% of the vehicle roof's area, provoking some users to mount two devices side by side in order to accommodate all of their luggage and equipment. But the most limiting factor of such existing devices is that they are very difficult to load and access, typically requiring a step ladder or other specialized ladders (e.g. one that fits over the rear tire) in order to reach the device once it is mounted on top of the vehicle.

U.S. application Ser. No. 15/972,070 describes a mechanism that raises the entire shell, much like a dump truck, such that the egressing tray will be able to reach the ground, thereby facilitating the loading of heavy wheeled equipment. Although this mechanism provides unique capability, in some situations the equipment stored in the shell may be de-stabilized when the shell is being tilted up unless each item is secured. Other inventions, such as sliding trays currently being marketed, have the drawback of not being able to carry heavy loads due to the resultant significant lever moment; nor are they able to change the angle of the tray's egress in order for it to reach the ground in order to allow for onboarding of wheeled heavy equipment.

Therefore, there exists a previously unappreciated need, and an inadequately addressed problem, requiring a new and improved cargo carrier for vehicles. There is a need for a cargo carrier that addresses the problems mentioned above; enables motorized and automated loading of cargo onto a containment shell or enclosure; employs an enclosure of a durable construction that maximizes a surface area for storage; and is easily utilized by a wide segment of consumers for a wide range of uses. It is to these ends that the present invention has been developed.

SUMMARY OF THE INVENTION

To minimize the limitations in the prior art, and to minimize other limitations that will be apparent upon reading and understanding the present specification, the present invention describes an automated self-loading cargo carrier for automobiles that facilitates storing a variety of items.

Generally, the invention involves a cargo carrier for vehicles that facilitates loading and unloading of items onto an enclosure; the cargo carrier may be automated and self-loading via actuators and a motorized mechanism that may be remotely controlled. The actuators may be configured to tilt the enclosure and one or more motors may be configured to deploy a deployable tray housed within the enclosure, which minimizes user loading or unloading labor. As will be apparent from the discussion of various exemplary embodiments, the present invention may be applicable to vehicles employing a roof rack as well as vans, and pick-up trucks. The present invention also solves the lever moment and angle problem within the tray design itself. The present invention provides additional features that, when combined, may transform a pickup bed into a "mobile workshop".

In some exemplary embodiments, on a front end of the enclosure, one or more actuators may couple the enclosure to a front portion of a vehicle support structure. On a rear end of the enclosure, one or more rear fittings may be configured to couple the enclosure to a rear portion of the vehicle support structure. In some exemplary embodiments, the support structure is a vehicle roof rack. In some exemplary embodiments, the support structure may include a bed of a truck or the interior surface of a van.

Typically, the enclosure incudes a front wall, side walls, a top surface, a bottom surface and a rear access door opposite to the front wall of the enclosure. Inside the enclosure, a deployable tray may be slidably housed therein, coupled to one or more motors that may be employed to deploy or slide the deployable tray outside of the enclosure during a loading or unloading sequence. To further assist a user during a loading or unloading sequence, the deployable tray may further include a conveyor mechanism or a means to lowering the tray in a manner that facilitates loading or unloading it.

In exemplary embodiments, a controller may be configured to communicate with a remote control so that a user may control the movement of the enclosure and the deployable tray remotely.

A cargo carrier in accordance with one exemplary embodiment of the present invention, comprises: an enclosure including rear fittings configured to tiltably couple the enclosure to a rear portion of a vehicle roof rack; a pair of actuators housed inside the enclosure, each of the pair of actuators including an extension arm adapted to couple to a front portion of the vehicle roof rack; a deployable tray, slidably housed within the enclosure; one or more motors coupled to the deployable tray; and a controller in communication with the pair of actuators and the one or more motors, the controller configured to: activate the pair of actuators to tilt the enclosure; and activate the one or more motors to slide the deployable tray outside of the enclosure.

A cargo carrier in accordance with another exemplary embodiment of the present invention, comprises: an enclosure defined by a front wall, side walls, a top surface, a bottom surface and a rear access door opposite to the front wall of the enclosure, the enclosure further including rear fittings configured to tiltably couple the enclosure to a rear portion of a vehicle roof rack; one or more actuators, each of the one or more actuators coupled to one of the side walls of the enclosure and including an extension arm configured to couple with a front portion of the vehicle roof rack; a deployable tray, slidably housed within the enclosure; and a controller in communication with the one or more actuators and configured to: draw power from a rechargeable battery housed within the enclosure; and activate the one or more actuators so as to raise the front wall of the enclosure in order to tilt the enclosure.

A cargo carrier in accordance with yet another exemplary embodiment of the present invention, comprises: a cargo carrier adapted to couple to a vehicle roof rack, including: an enclosure adapted to tiltably couple to an aft end of the vehicle roof rack; one or more actuators, each of the one or more actuators coupled to a side wall of the enclosure and including an extension arm, the extension arm adapted to couple to a fore end of the vehicle roof rack; a deployable tray, slidably housed within the enclosure; a first motor coupled to the deployable tray; a second motor coupled to a conveyor mechanism installed on to the deployable tray; and a controller in communication with the one or more actuators, the first motor and the second motor, wherein the controller is configured to: draw power from a rechargeable battery housed within the enclosure; activate the one or more actuators so as to raise a front wall of the enclosure in order to tilt the enclosure; and activate the first motor to deploy the deployable tray outside of the enclosure; and activate the second motor to move the conveyor mechanism installed on the deployable cover; and a remote control configured to remotely control movement of the enclosure and the deployable tray.

In some exemplary embodiments, a cargo carrier is adapted for the bed of a pickup truck. In one version of this exemplary embodiment, the cargo carrier may include: an enclosure including fittings configured to couple the enclosure to a truck bed; a first deployable tray, slidably housed within the enclosure, the first deployable tray including a tiltable surface; one or more actuators, including: at least one actuator adapted to extend and retract the first deployable tray outside and inside the enclosure, respectively; and at least one actuator adapted to tilt the tiltable surface of the first deployable tray; and a controller in communication with the one or more actuators and configured to: activate the one or more actuators to slide the first deployable tray outside of the enclosure; and activate the one or more actuators to tilt the tiltable surface of the first deployable tray.

In another version of this exemplary embodiment, the cargo carrier may include: an enclosure defined by a front wall, side walls, a top surface, a bottom surface and a rear access door opposite to the front wall of the enclosure, the enclosure further including fittings configured to couple the enclosure to a truck bed; a first deployable tray, slidably housed within the enclosure, the first deployable tray including a tiltable surface; one or more actuators, including: at least one actuator housed inside the enclosure adapted to extend and retract the first deployable tray outside and inside the enclosure, respectively; and at least one actuator coupled to a surface of the first deployable tray and adapted to tilt the tiltable surface of the first deployable tray; and a controller in communication with the one or more actuators, the controller configured to: activate the one or more actuators to slide the first deployable tray outside of the enclosure; and activate the one or more actuators to tilt the tiltable surface of the first deployable tray.

It is an objective of the present invention to provide an efficient vehicle cargo carrier that addresses the limitations of the prior art mentioned above.

It is another objective of the present invention to provide an efficient vehicle cargo carrier that facilitates easy loading and unloading, while maximizing cargo space.

It is yet another objective of the present invention to automate a loading and unloading sequence.

It is yet another objective of the present invention to provide a cargo carrier to be installed on a support structure of a vehicle, such as a truck bed, an interior surface or a roof rack of the vehicle.

It is yet another objective of the present invention to provide a cargo enclosure that conforms to the length and width of a vehicle.

It is yet another objective of the present invention to provide a cargo carrier enclosure that contours to structural components of a vehicle in order to maximize storage space and conform to the vehicle's design.

It is yet another objective of the present invention to provide a cargo carrier enclosure that contours about a vehicle's roof rack in order to maximize storage space and conform to the vehicle's roof.

It is yet another objective of the present invention to provide a cargo carrier with a single piece molded construction enclosure.

It is yet another objective of the present invention to provide a cargo carrier with modular components customizable for different purposes.

These advantages and features of the present invention are not meant as limiting objectives, but are described herein with specificity so as to make the present invention understandable to one of ordinary skill in the art.

BRIEF DESCRIPTION OF THE DRAWINGS

The cargo carrier as disclosed herein is further described in terms of exemplary embodiments. These exemplary embodiments are described in detail with reference to the drawings, which have not necessarily been drawn to scale in order to enhance their clarity and improve understanding of the various embodiments of the invention. Furthermore, elements that are known to be common and well understood to those in the industry are not depicted in order to provide a clear view of the various embodiments of the invention. These embodiments are non-limiting exemplary embodiments, in which like reference numerals represent similar structures throughout the several views of the drawings. The drawings that accompany the detailed description can be briefly described as follows:

FIG. 2C illustrates a perspective exploded view of a cargo carrier in accordance with an exemplary embodiment of the present invention.

FIG. 7A-7D illustrate a cargo carrier in accordance with an exemplary embodiment of the present invention.

FIG. 22 illustrates a close-up view of one exemplary means of coupling an exemplary and optional workbench component to the interior of the cargo carrier.

FIG. 22A-FIG. 22B illustrate an exemplary embodiment of the present invention, including a deployable tray that may function as an awning to provide shade.

DETAILED DESCRIPTION OF THE INVENTION

Figure 1A:
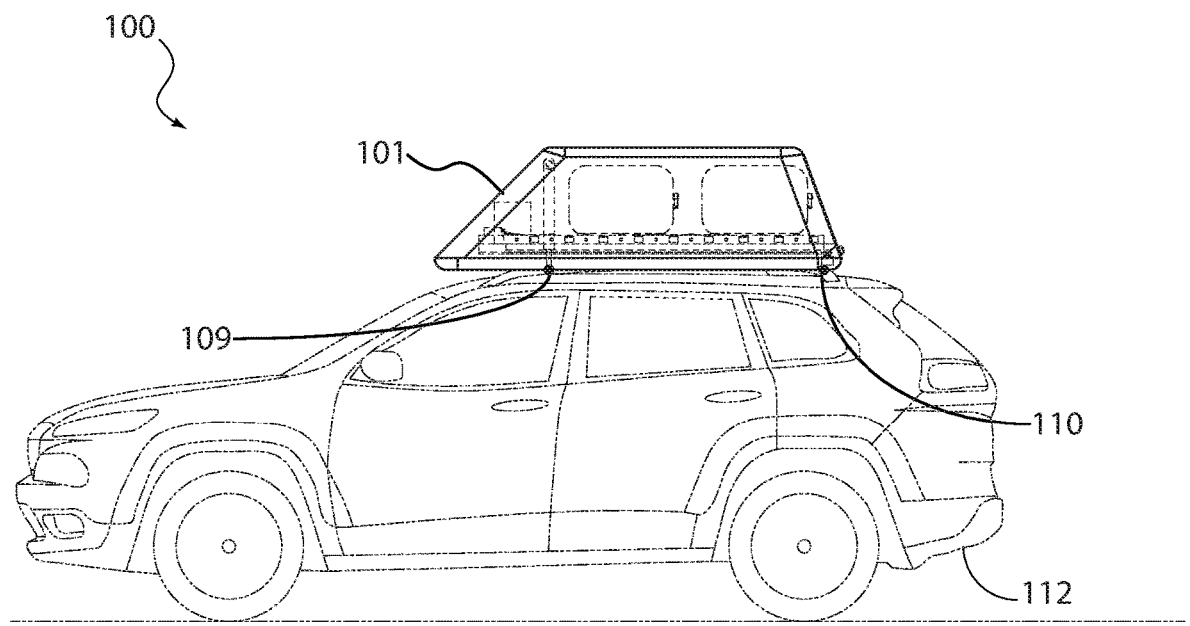
FIG. 1A-1D illustrate a side view of a cargo carrier installed on a vehicle roof in accordance with an exemplary embodiment of the present invention, the cargo carrier shown in different non-active and active positions.
Figure 1B:
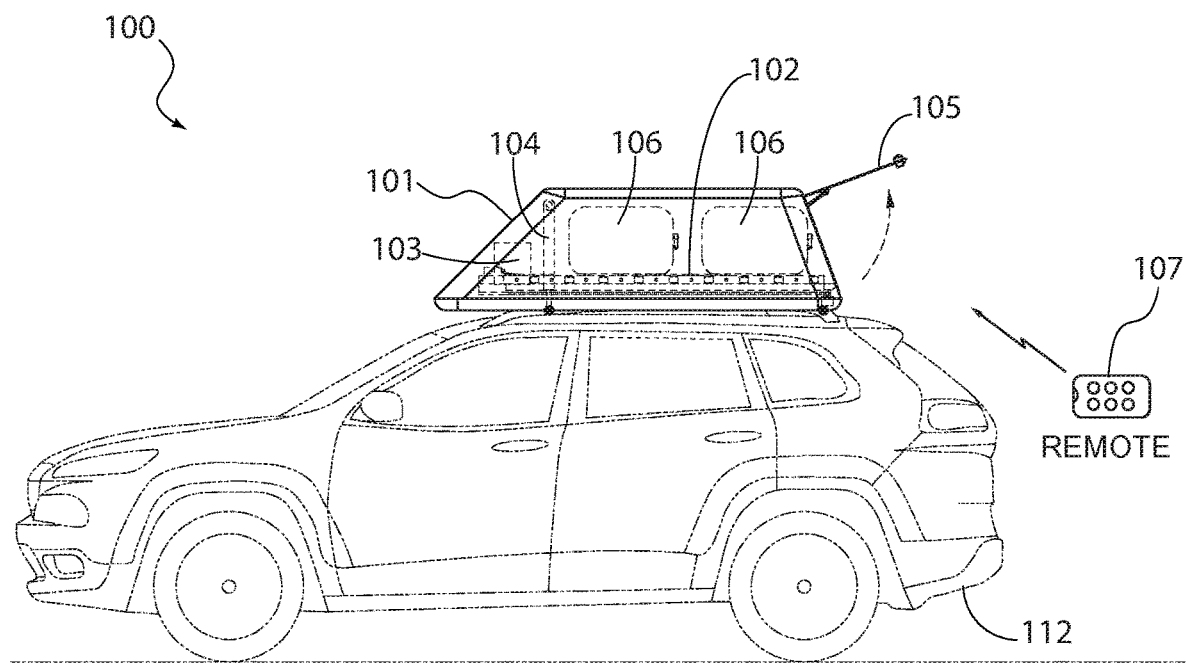
Figure 1C:
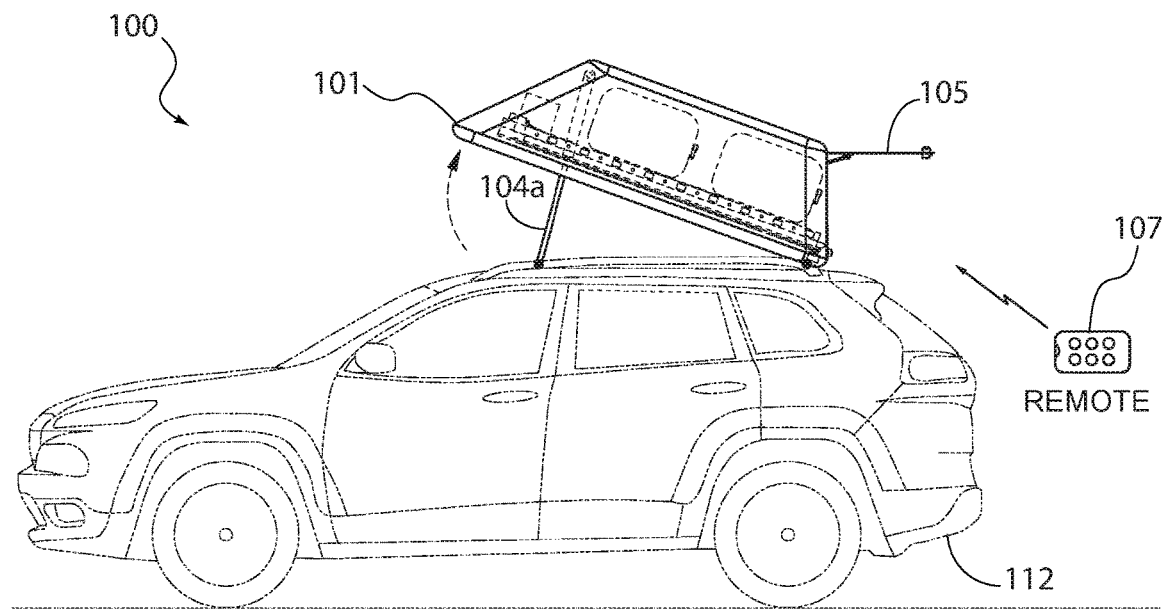
Figure 1D:
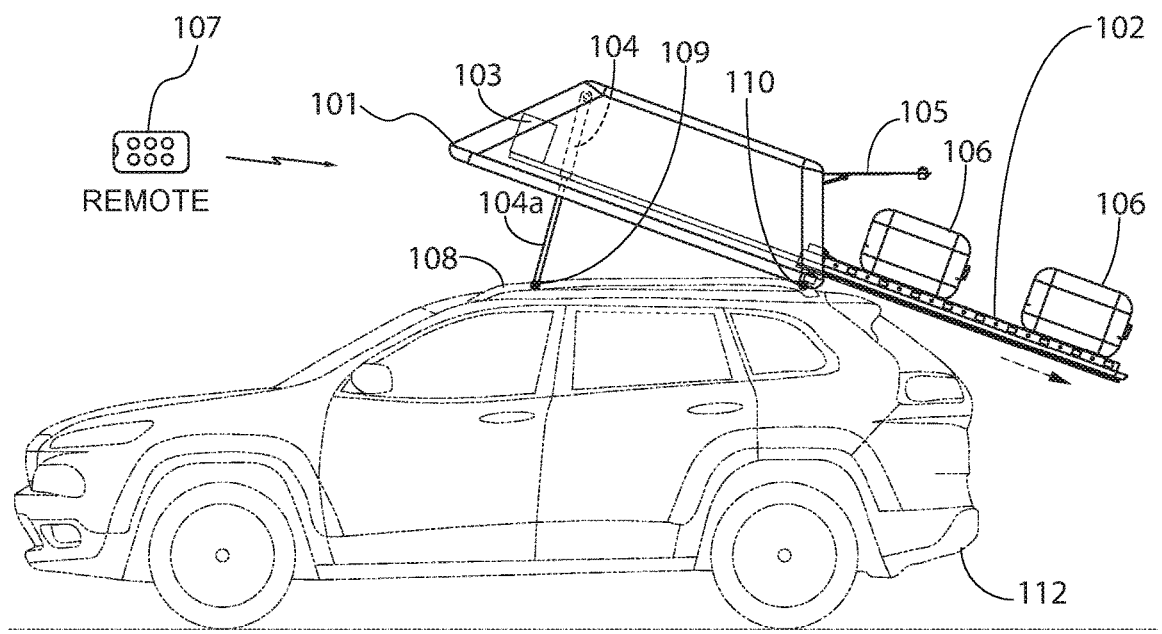
Figure 1E:
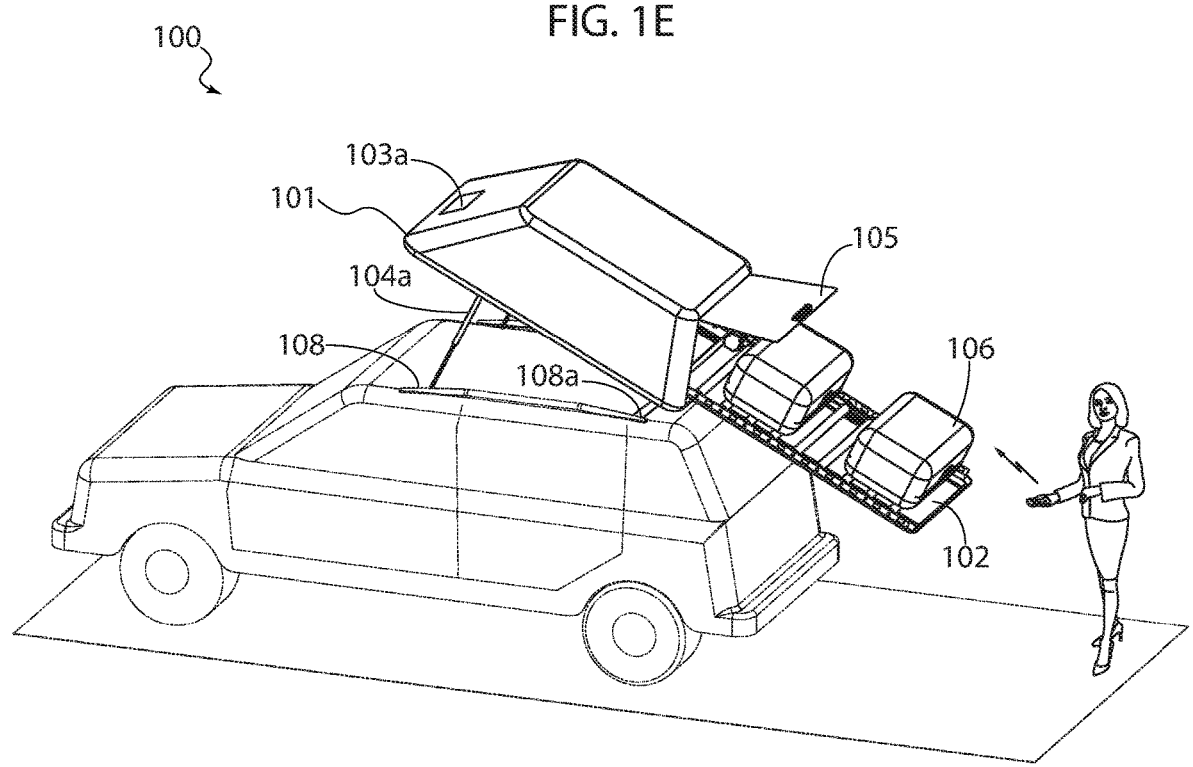
FIG. 1E illustrates a perspective view of a cargo carrier installed on a vehicle roof in accordance with an exemplary embodiment of the present invention.
Figure 1F:
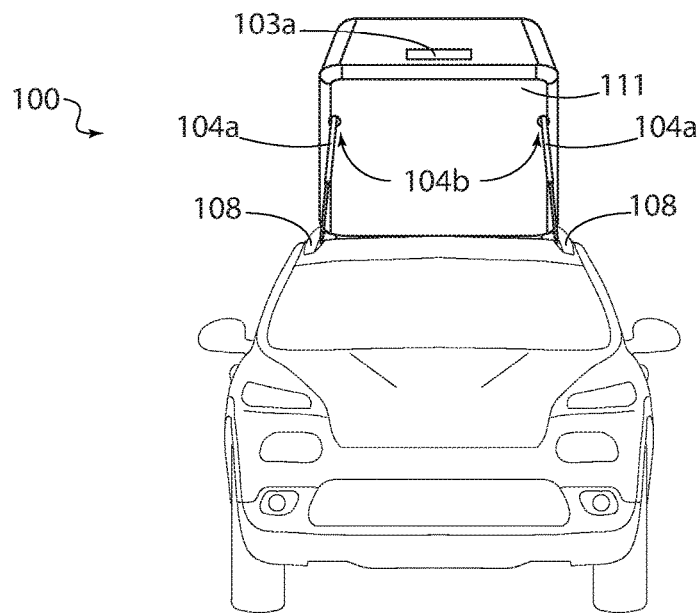
FIG. 1F illustrates a front view of a cargo carrier installed on a vehicle roof in accordance with an exemplary embodiment of the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized, and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

Turning now to the figures, FIG. 1A-1F illustrate a side view of a cargo carrier installed on a vehicle roof in accordance with an exemplary embodiment of the present invention, the cargo carrier shown in different non-active and active positions. More specifically, these figures depict cargo carrier 100, which includes enclosure 101 that is typically coupled to a vehicle support structure such as vehicle rack 108 of vehicle 112. Enclosure 101 may house (among other components further discussed below with reference to other figures) deployable tray 102, a power supply 103, and one or more actuators 104. Typically, enclosure 101 is defined by a front wall, side walls, a top surface, a bottom surface and a rear access door 105 opposite to the front wall.

Enclosure 101 may be constructed of a variety of materials without deviating from the scope of the present invention. In exemplary embodiments, enclosure 101 comprises high-density plastic that is rotationally molded, resulting in a completely enclosed shell. In exemplary embodiments, two access openings may be cut out of the single-piece shell to form: (i) an access opening at the forward face or face wall of enclosure 101 providing access to power supply 103 and (ii) another opening opposite to the front wall of enclosure 101 for the rear face access to the interior of the shell, wherein the rear access opening is substantially as wide as a width of enclosure 101 in order to accommodate deployable tray 102 sliding out and back inside enclosure 101 during operation of cargo carrier 100. Enclosure 101 preferably although not necessarily conforms to a vehicle's design such that the enclosure minimizes interference with structural components of the vehicle. This maximizes storage space and, in some embodiments, (i.e. wherein enclosure 101 is coupled to a vehicle rack as depicted in this set of figures) reduces wind turbulence. For example, and without limiting the scope of the present invention, when coupled to a vehicle rack as shown, rather than sit between the longitudinal rails of vehicle rack 108 of vehicle 112, and rather than sitting completely above each of the longitudinal rails, enclosure 101 may include a bottom surface that contours to each longitudinal rail. Storage space is maximized as the width of the shell may be as widened, and this design enables enclosure 101 of cargo carrier 100 to rest closer to the roof of vehicle 112.

Deployable tray 102 is typically a retractable surface or tray that is slidably coupled to an interior of enclosure 101 and slides in and out of enclosure 101 to facilitate loading and unloading of items 106 stored therein. Deployable tray 102 (as will be discussed further below) may implement a conveyor mechanism that facilitates such loading and unloading sequence. Deployable tray 102 may be constructed of a variety of materials without deviating from the scope of the present invention. In exemplary embodiments, deployable tray 102 is made of molded plastic (industrial versions, described below, may have aluminum litters) and may be configured to translate or slide in and out of enclosure 101 on—for example and without limitation— heavy duty ball bearing slides. As mentioned above, deployable tray 102 may be motorized and remotely controlled.

Power supply 103 may be a battery or more specifically a rechargeable battery pack, which in exemplary embodiments is installed at a front end of enclosure 101 so as to provide easy access in case of required maintenance, recharge or replacement. In exemplary embodiments, power supply 103 is configured to receive power from photovoltaic cells disposed on one or more exterior surfaces of enclosure 101. In some exemplary embodiments, the photovoltaic cells or solar panels may be, for example, disposed in a recessed surface or region of the enclosure such that the solar panels are flush with an exterior surface of the enclosure. As such, in some exemplary embodiments, power supply 103 includes a rechargeable battery pack that may be recharged with solar power from the photovoltaic cells as well as power from an external power source. In order to provide easy access to power supply 103, enclosure 101 may include an access door such as access door 103a. In some exemplary embodiments, access door 103a is cut from the front wall or front face of enclosure 101 during construction of enclosure 101. Access door 103a may be hinged at an upper edge of the smaller front opening of enclosure 101 and may include an electric lock attached to a lower edge of access door 103a so that access door 103a may be operated remotely. Moreover, in some exemplary embodiments, access door 103a may be configured for automatically opening and or closing. To these ends, in some exemplary embodiments, access door 103a may implement dual bi-directional linear actuators attached to the interior of enclosure 101. Other known features may be implemented in exemplary embodiments such as implementation of a sealing component or a rubber grommet that may be employed between access door 103a and enclosure 101 to eliminate potential leakage of water into enclosure 101 during inclement weather.

Actuators 104 may be any type of actuators suitable for raising a front end of enclosure 101 of cargo carrier 100, in order to tilt enclosure 101 in the manner depicted in FIG. 1C—FIG. 1F; this position allows deployable tray 102 to be slid out or positioned at a lower height in order to allow a user to use minimal effort in loading their items onto enclosure 101. This feature is particularly useful when, as in the shown embodiment, enclosure 101 is installed on a vehicle's roof rack such as vehicle rack 108; while a user typically would require greater effort to raise an item up to the height of the roof of vehicle 112, tilting enclosure 101 and sliding or lowering deployable tray 102 merely requires the user to lift the desired item up to a much more manageable height. In exemplary embodiments, as will be discussed in more detail below, actuators 104 are configured to tilt enclosure 101 such that deployable tray 102 may be lowered to a height suitable for users, such as for example and without limiting the scope of the present invention, a user's waist-height, knee-height, thigh-height or any suitable height that makes loading and unloading manageable to users; in an exemplary embodiment, deployable tray 102 may be lowered to a height of approximately 24 inches. In exemplary embodiments, actuators 104 are housed within enclosure 101; however, in other exemplary embodiments, actuators 104 may be coupled to an exterior of enclosure 101 without deviating or limiting the scope of the present invention. Of course, housing actuators 104 within enclosure 101 maximizes enclosure 101's conformity to the design of vehicle 112, while implementation of actuators 104 on an exterior of enclosure 101 may maximize a storage space within enclosure 101. In some exemplary embodiments, a single actuator may be utilized. In some exemplary embodiments, a pair of actuators may be employed. In some exemplary embodiments, more than one actuator is employed without limiting the scope of the present invention.

Actuators 104 may comprise of any type of actuators suitable for tilting a position of enclosure 101. In some exemplary embodiments, actuators 104 comprise of linear actuators that are electrically powered actuators (one on each side of enclosure 101). As will be mentioned in more detail below, each actuator may be coupled to vehicle rack 108 at a front portion 109 of the longitudinal rails of rack 108; when actuators 104 are activated, the front portion of enclosure 101 is raised while one or more aft attach fittings 110 coupling enclosure 101 to a rear portion of rack 108 enable enclosure 101 to rotate about an axis through the two aft attach fittings 110. This may be achieved by coupling aft attach fittings 110 to a portion of longitudinal rails of rack 108 such as horizontal rail 108a via hinges. Accordingly, actuators 104 typically include extension arms 104a that may traverse through a portion of enclosure 101 such as openings 104b situated at a bottom surface 111 of enclosure 101 in order to extend a length of each actuator 104 below the bottom surface 111 of enclosure 101 thereby raising the front end of enclosure 101 as described and exemplarily shown in the figures.

Access door 105 may be constructed of the same material as enclosure 101 or may be constructed of a different material altogether without limiting the scope of the present invention. In some exemplary embodiments, access door 105 is cut from the rear face of enclosure 101 during construction of enclosure 101. Access door 105 may be hinged at an upper edge of the rear opening of enclosure 101 and configured for automatically opening and or closing. In some exemplary embodiments, access door 105 may implement dual bi-directional linear actuators attached to the sides and interior of enclosure 101. Access door 105 may include an electric lock attached to a lower edge of access door 105 that can be operated remotely. Other known features may be implemented in exemplary embodiments such as implementation of a sealing component or a rubber grommet that may be employed between access door 105 and enclosure 101 to eliminate potential leakage of water into enclosure 101 during inclement weather.

Items 106 may of course comprise any storable items, including but not limited to typical travel items such as suitcases (as shown), boxes, sports equipment, or other items a user may choose to travel with including but not limited to occupational tools, other equipment, etc. As will be discussed with reference to other figures below, depending on the type or structure of storable items 106, enclosure 101 and or deployable tray 102 may employ components to facilitate the secured storage of such items; the components may include a molded tray suitable for storing tools and equipment having known universal shapes, or clamps for securing items such as skis so that the skis stay secured to a side wall or interior surface of enclosure 101.

In order to control activation of actuators 104 and any motor or set of motors that may be employed by deployable tray 102, a control circuitry may be configured to communicate with each device and may further be configured to communicate with a remote-control device, such as remote control 107 so that a user may control activation of each component remotely. Remote control 107 may facilitate a user to: remotely activate the movement (including the tilting and leveling) of enclosure 101 by activation of actuators 104; remotely activate the movement (including the sliding out and sliding in) of deployable tray 102 by activation of one or more motors coupled to deployable tray 102; and or remotely activate a locking and or opening and closing of access doors such as access doors 103a and 105.

Cargo carrier 100 is attached at four points to the longitudinal rails of rack 108 of vehicle 112: left, right, fore and aft, wherein the two forward attachment points 109 connect actuators 104 (one on each side of enclosure 101) to the forward mounting points on the longitudinal rails of rack 108; and wherein the two aft attach fitting points 110 couple enclosure 101 to a rear portion of longitudinal rails of rack 108 (e.g. in the embodiment of FIG. 1E a horizontal rail 108a may be utilized instead) enable the enclosure to rotate about an axis through the two aft attach points 110 (i.e. one on each side of enclosure 101); in exemplary embodiments, aft attach fittings 110 are hinged attachment fittings. In some exemplary embodiments, linear actuators raise the enclosure to a maximum angle of approximately thirty degrees. In some exemplary embodiments, the angle is adjustable, determined by how far the linear actuators are extended. For example, and without deviating from the scope of the present disclosure, the taller the user of cargo carrier 100 and the longer the length of enclosure 101, the less angle required for the end of the deployable tray 102 that will be required to extend down to a suitable height that makes loading and unloading manageable to users of cargo carrier 100. In exemplary embodiments, the angle and or height at which deployable tray 102 may be lowered to is programmable using remote control 107; for example, and without limiting the scope of the present invention, remote 107 may be programmable with different heights and or positions for different users (e.g., husband and wife) to raise enclosure 101 and extend deployable tray 102 to each user's desired loading position.

In the embodiments depicted in FIG. 1A-FIG. 1F, it may be appreciated that cargo carrier 100 is a self-loading cargo container, which may be conveniently mounted to vehicle 112's roof rack. Cargo carrier 100 facilitates any person to single handedly load items 106 (such as luggage or any other object that they can lift to a suitable height such as waist-high) into enclosure 101, which securely sits on top of vehicle 112. Whether vehicle 112 is a small SUV, a large SUV, a pickup truck or van, regardless of the height of the vehicle's roof, cargo carrier 100 minimizes efforts for loading and unloading storable items. In contrast to prior devices, cargo carrier 100 is unique in several key aspects that enable a more rigid, spacious container that can be easily loaded without the use of ladders or help from other individuals as is commonly required with known devices. Most significantly, cargo carrier 100 loads automatically, and may be operated by one individual, regardless of stature, and can carry heavier cargo because the individual cargo pieces need only be lifted to a manageable height such as thigh high or waist high instead of to the top of the vehicle, as required with current storage devices. Moreover, in exemplary embodiments involving vehicles with larger roof surface areas, e.g. large SUVs or extended vans, the deployable tray may extend far enough to touch the ground, enabling cargo to actually be wheeled onto the tray via a ramp extension; such embodiment is discussed further below with reference to FIG. 7A and FIG. 7B.

Figure 2A:
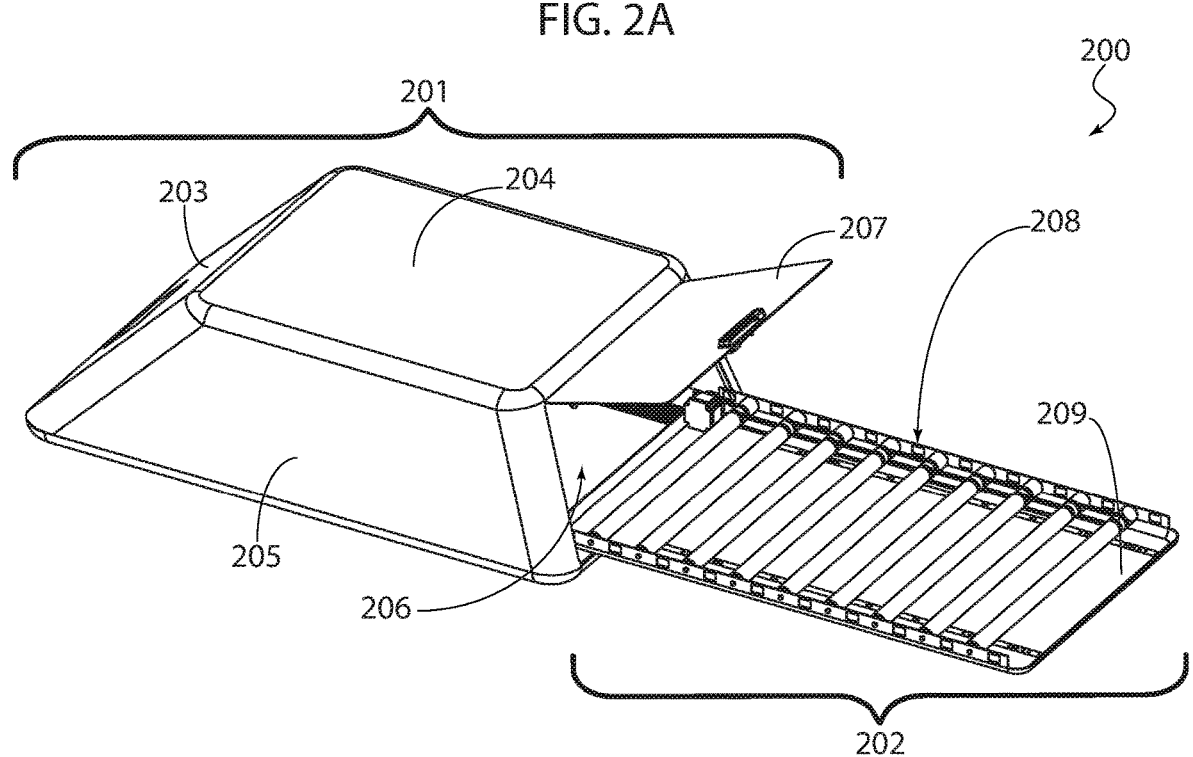
FIG. 2A illustrates a perspective top view of a cargo carrier in accordance with an exemplary embodiment of the present invention.
Figure 2B:
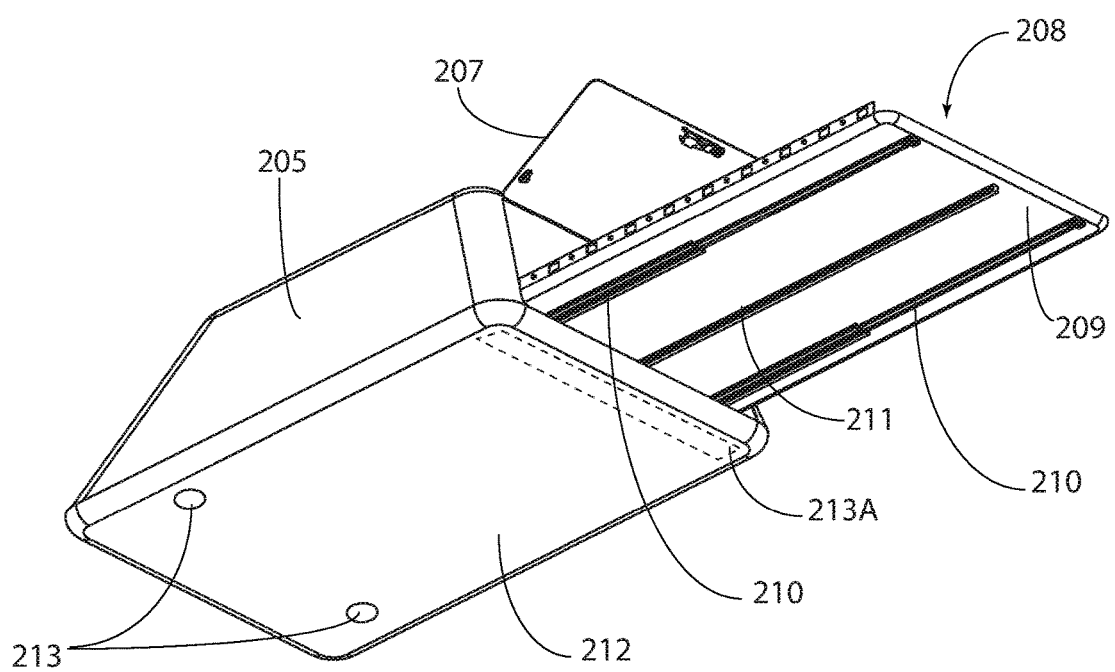
FIG. 2B illustrates a perspective bottom view of a cargo carrier in accordance with an exemplary embodiment of the present invention.

Turning now to the next set of figures, FIG. 2A illustrates a perspective top view of a cargo carrier in accordance with an exemplary embodiment of the present invention; FIG. 2B illustrates a perspective bottom view of a cargo carrier in accordance with an exemplary embodiment of the present invention; and FIG. 2C illustrates a perspective exploded view of a cargo carrier in accordance with an exemplary embodiment of the present invention. More specifically, these figures depict cargo carrier 200, comprising an enclosure 201 that secures or houses deployable tray 202 within.

From these views, enclosure 201, deployable tray 202 and other components of a device in accordance with the present invention may be better appreciated. As mentioned above, the shape of an enclosure for a cargo carrier in accordance with the present invention may be such that aerodynamics of a traveling vehicle are aided by the conforming design of the enclosure. In the current embodiment depicted in these figures, enclosure 201 includes a front wall or face wall 203 that may be slightly slanted (in some embodiments slanted about 30 degrees i.e. to minimize wind loading), a flat top surface 204, flat side walls 205 and a rear opening 206 to which access is controlled via access door 207; moreover, a rear portion of enclosure 201 is slightly slanted albeit less so than face wall 203. The edges of the enclosure may be sharp or rounded as shown without deviating from the scope of the present invention.

In exemplary embodiments, enclosure 201 is a single-piece molded enclosure made of a high-density plastic that is rotationally molded; such rigid single-piece construction facilitates additional storage on the interior and exterior of enclosure 201. Two access openings, a first access opening removably covered with access door 203A (on face wall 203) and a second access opening or rear opening 206 (to which access is controlled via access door 207) are cut out of the single-piece molded enclosure. Access opening 203A is typically a small opening that may measure approximately 12" wide×8" tall, is as mentioned above cut from front or face wall 203 of the enclosure 201, and is used to access battery pack 216, typically situated at the front of the enclosure for the reasons stated above, albeit without limiting the scope of the present invention. The second access opening or rear opening 206 is typically a larger opening that may measure approximately 36" wide and 14" tall, is cut from the rear face or rear wall of the enclosure 201 and is large enough to allow deployable tray 201 loaded with storable items such as luggage (lying flat) to pass through. Other openings at a bottom surface 212 of enclosure 201 may be implemented for traversing actuator extension arms therethrough; that is, in exemplary embodiments wherein actuators are housed within enclosure 201, openings 213 may be implemented so as to allow extension arms of each actuator to extend from these openings 213. As may be appreciated from the view of FIG. 2B, the openings would align with the rails of a vehicle roof rack such that the roof rack's longitudinal rails are below enclosure 201, which as mentioned above maximizes the storage space of cargo carrier 200. Similarly, aft or rear hinged attachment fittings 213A may be positioned and coupled along a rear section of the enclosure to tiltably couple the enclosure to a rear portion of a vehicle roof rack, in a manner so as to enable the enclosure 201 to rotate about an axis between the two rear hinged attachment fittings 213A (i.e. one on each side of enclosure 201 along the marked region in FIG. 2B).

In exemplary embodiments, enclosure 201 occupies an entire area of the roof of the vehicle, which means that enclosure 201 provides more than twice the volume of most known cargo shells installed on vehicle roof racks. In exemplary embodiments, enclosure 201 is conformal to the extent that the front and rear faces of the container are approximately tangent and contiguous with the planes of the windshield and hatchback, respectively (van containers' rear faces will be perpendicular to the roof plane since the rear panels or doors of vans are also perpendicular to the roof plane). As such, in some exemplary embodiments, the rear portion of enclosure 201 is slightly slanted although less so than front face 203.

In some exemplary embodiments, deployable tray 202 is made of molded plastic, aluminum or any other materials with a suitable strength to support storable items, depending on the requirements of deployable tray 202. Moreover, deployable tray 202 may be motorized as mentioned above. Whether or not a conveyor mechanism 208 is implemented, in exemplary embodiments, deployable tray 202 may be slid out and back into enclosure 201 with the aid of a plurality of tracks and a motor to control movement of the deployable tray 202. For example, and as in the shown embodiments of FIG. 2A-FIG. 2C, deployable tray 202 may include a flat surface 209 on which items may be placed to be loaded onto enclosure 201. A bottom portion of surface 209 may include tracks 210 for keeping a slidable movement of the deployable tray 202 running smoothly. Moreover, in some exemplary embodiments, a middle component 211 (such as a rack and pinion or ball screw component) may be implemented in a manner such that component 211 couples with motor 217, for controlling movement of deployable tray 202.

Movement of deployable tray 202, and more specifically tray surface 209, may be accomplished by a first motor 217. In exemplary embodiments, motor 217 is a pancake-type stepper motor (although other DC motor types may be employed without deviating from the scope of the present invention) attached to the aft end of the inside bottom surface 212 of enclosure 201. Motor 217 may implement a pinion gear attached to it that is meshed with track 211 that is mounted to the underside of tray surface 209, oriented longitudinally along the centerline of deployable tray 202.

Deployable tray 202 may implement low side rails 208b (i.e. in exemplary embodiments, approximately 2" high) that are horizontally slotted periodically (approximately 18-24" apart) along the sides of tray surface 209 to accommodate cargo straps to secure the load. As an option, recoiling cargo straps may be attached to one of the side rails 208b of tray surface 209 of deployable tray 202, and hooked into the corresponding slots on the other side of side rails 208b. Of course, other means of mechanizing deployable tray 202 may be achieved without deviating from the scope of the present invention. For example, and without limiting the scope of the invention, deployable tray 202 may employ a ball screw and ball nut mechanism, similar to the way tables on machine tools are moved; such solution may be more rigid and quieter than the rack and pinion option, but also more expensive.

In some exemplary embodiments, as shown, a conveyor mechanism 208 is implemented. For example, and without limiting the scope of the present invention, a motorized conveyor includes a snap-in or bolt-in option that installs inside tray surface 209. The conveyor mechanism may be powered by a second motor, also mounted to the inside bottom of tray surface 209 (at the forward end of tray surface 209). The conveyor's rollers may be belt-driven, coupled to the second motor. This option allows for easier loading by "feeding" pieces of storable items such as luggage, etc. forward from the aft end of the tray surface 209, which in practice will be situated at the lowest point with reference to the ground when enclosure 201 is in an inclined or tilted position. An alternate method for powering the conveyor is to have one or more of the rollers motorized, a slightly more elegant but significantly more expensive solution. In the shown embodiment, conveyor mechanism 208 exemplarily comprises a plurality of rotatable tubes or rollers 208a that lay perpendicular to a length of deployable tray 202 across tray surface 209 and coupled to side rails 208b. Movement of conveyor mechanism 208 may be accomplished via a belt 215 coupled to rollers 208a driven by a motor 214.

Although not shown in the views of FIG. 2A-FIG. 2C, the actuators shown in FIG. 1A-FIG. 1F and the controller discussed below with reference to FIG. 3, may be employed by cargo carrier 200. Accordingly, in some exemplary embodiments, cargo carrier 200 comprises: an enclosure 201 including rear hinged attachment fittings 213A configured to tiltably couple the enclosure 201 to a rear portion of a vehicle roof rack (for example rack 108); a pair of actuators (for example actuators 104) housed inside the enclosure 201, each of the pair of actuators 104 including an extension arm 104a adapted to couple to a front portion of the vehicle roof rack 108; a deployable tray 202, slidably housed within the enclosure 201; one or more motors (motor 214 and or motor 217) coupled to the deployable tray 201; and a controller (for example see controller 303 below) in communication with the pair of actuators 104 and the one or more motors 214 and or 217, the controller 303 configured to: activate the pair of actuators 104 to tilt the enclosure 201; and activate the one or more motors to slide the deployable tray 202 outside of the enclosure 201.

Similarly, in other exemplary embodiments, cargo carrier 200 comprises: an enclosure 201 defined by a front wall 203, side walls 205, a top surface 204, a bottom surface 212 and a rear access door 207 opposite to the front wall 203 of the enclosure 201, the enclosure 201 further including rear hinged attachment fittings 213A configured to tiltably couple the enclosure 201 to a rear portion of a vehicle roof rack 108; one or more actuators 104, each of the one or more actuators coupled to one of the side walls 205 of the enclosure 201 and including an extension arm 104a configured to couple with a front portion of the vehicle roof rack 108; a deployable tray 202, slidably housed within the enclosure 201; and a controller 303 in communication with the one or more actuators 104 and configured to: draw power from a rechargeable battery 216 housed within the enclosure 201; and activate the one or more actuators 104 so as to raise the front wall 203 of the enclosure 201 in order to tilt the enclosure 201.

Figure 3:
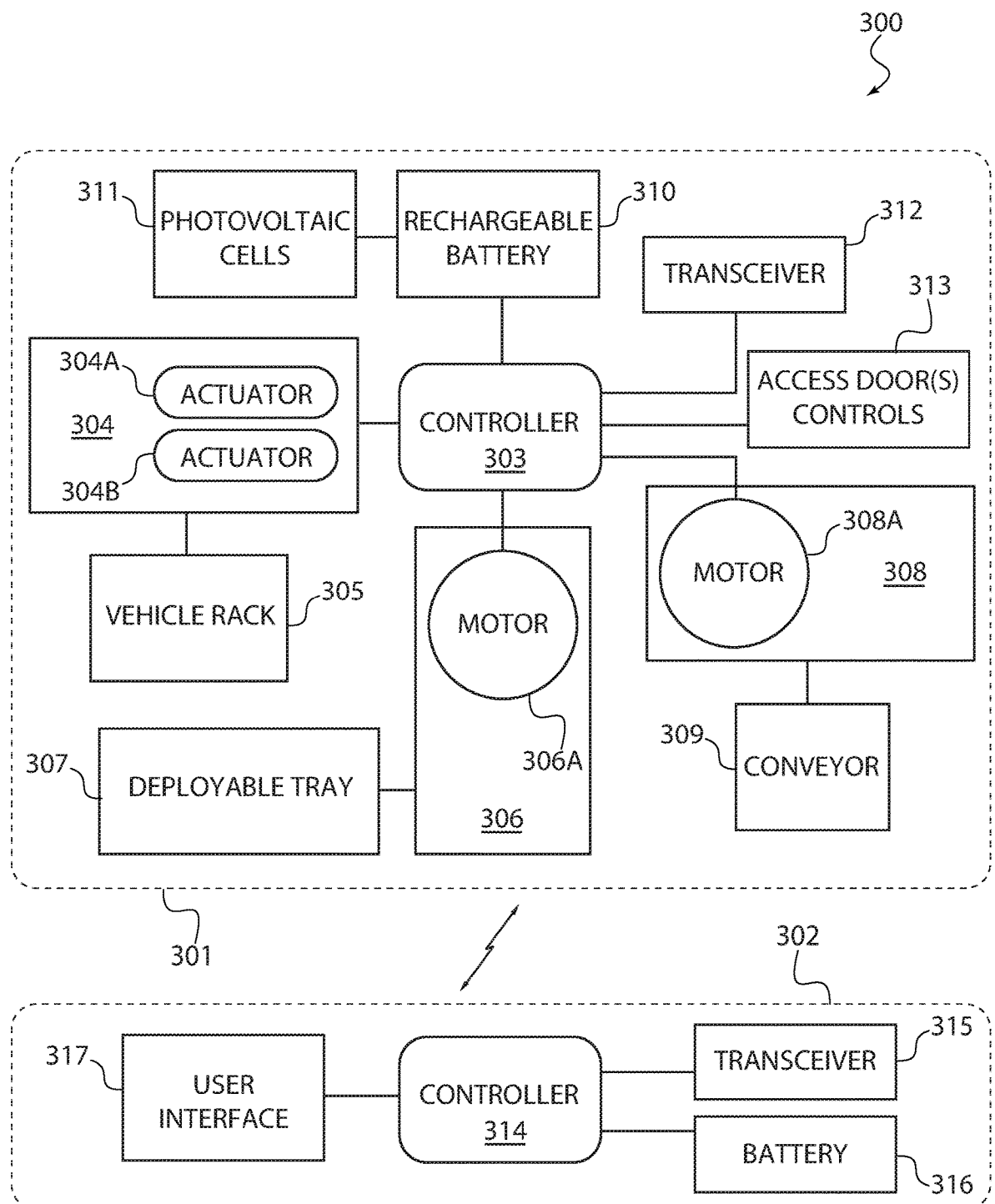
FIG. 3 illustrates a block diagram of various components for a cargo carrier system in accordance with an exemplary embodiment of the present invention.

Turning now to the next figure, FIG. 3 illustrates a block diagram of various components for a cargo carrier system in accordance with an exemplary embodiment of the present invention. More specifically, FIG. 3 depicts system 300, which includes cargo carrier 301 and a remote control 302 configured to remotely control movement of the various components of system 300.

Components of cargo carrier 301 include controller 303, which may be any type of controller suitable for communicating with the various actuators and or motors employed by cargo carrier 301. In exemplary embodiments, controller 303 is a multi-phase controller configured to: activate lifting actuator module 304 (which may comprise one or more actuators such as actuators 304A and 304B coupled to vehicle rack 305); activate sliding tray module 306 (which may comprise a motor 306A coupled to deployable tray 307); and activate rolling conveyor module 308 (which may comprise a motor 308A coupled to conveyor 309).

Controller 303 may draw power from a rechargeable battery 310, which may be in turn supplied by power from a solar energy via photovoltaic cells 311. As mentioned above, photovoltaic cells 311 may be disposed on a surface of an enclosure in accordance with the present invention.

In some exemplary embodiments, as shown in this current figure, controller 303 utilizes a receiver or transceiver 312 to communicate with remote control 302 and receive commands therefrom. In some exemplary embodiments, independent rocker-type switches may be employed to hold down in one direction or the other to activate: lifting actuator module 304, sliding tray module 306 and or rolling conveyor module 308. Controller 303 may further communicate with an access door control module 313 including additional open/close actuators and or lock/unlock switches configured to operate access doors of the enclosure. The controller may also be programmable, in the sense that it will have the ability to store multiple pre-set lift angles and shelf extensions to accommodate the various waist heights of different users.

This may be optionally achieved, without limiting the scope of the present invention, via remote control 302. In some exemplary embodiments, remote control 302 includes a controller 314, which may communicate with controller 303 via a transmitter or transceiver 315 using any known technologies including but not limited to a Bluetooth protocol or any other wireless communication protocols known in the art. Remote control 302 typically includes battery 316 as a source of power for controller 314, and a user interface 317. User interface 317 may vary in complexity without deviating from, or limiting the scope of, the present invention. For example, user interface 317 may include a screen display or may be as simple as a few pre-programmed buttons.

Accordingly, in an exemplary embodiment, cargo carrier system 300 comprises a cargo carrier 301 adapted to couple to a vehicle rack 305 of a vehicle, including: an enclosure adapted to tiltably couple to an aft end of the vehicle rack 305; an actuator module 304 including one or more actuators 304A, 304B, each of the one or more actuators coupled to a side wall of the enclosure and including an extension arm, the extension arm adapted to couple to a fore end of the vehicle rack 305; a deployable tray 307, slidably housed within the enclosure; a first motor module 306 including a first motor 306A coupled to the deployable tray 307; a second motor module 308 including a second motor 308A coupled to a conveyor mechanism 309 installed onto the deployable tray 307; and a controller 303 in communication with the one or more actuators 304A, 304B, the first motor 306A and the second motor 308A, wherein the controller 303 is configured to: draw power from a rechargeable battery 310 housed within the enclosure; activate the one or more actuators 304A, 304B so as to raise a front wall of the enclosure in order to tilt the enclosure; and activate the first motor 306A to deploy the deployable tray 307 outside of the enclosure; and activate the second motor 308A to move the conveyor mechanism 309 installed on the deployable tray 307. Furthermore, system 300 may include a remote control 302 configured to remotely control movement of the enclosure and the deployable tray via wireless communication with controller 303.

Figure 4A:
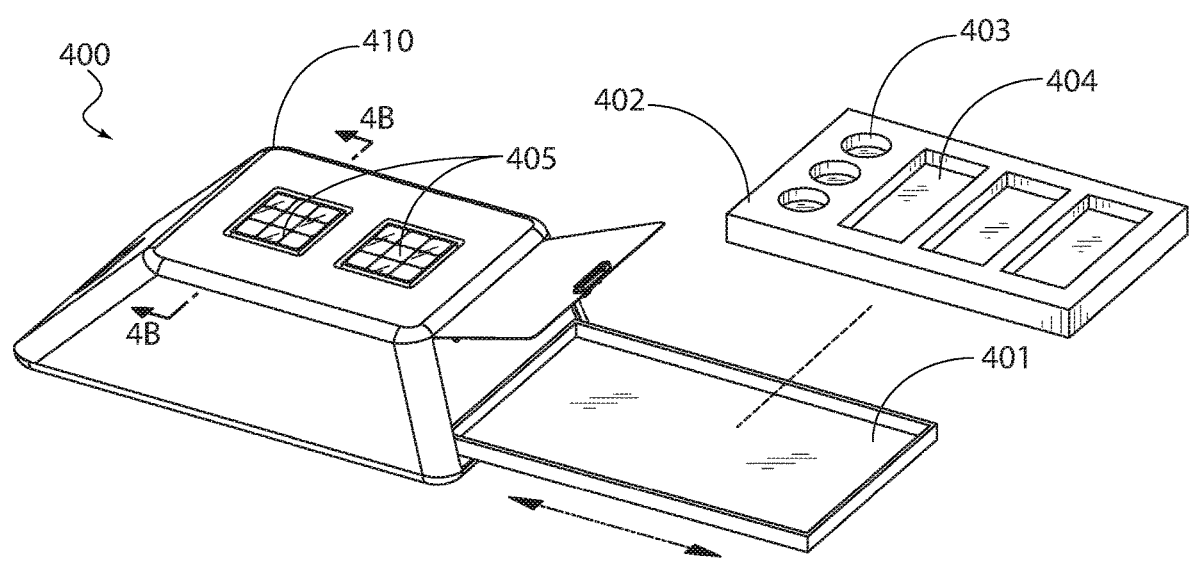
FIG. 4A-FIG. 4B illustrates a modular kit for customizing the utility of a cargo carrier in accordance with an exemplary embodiment of the present invention; in such embodiment, photovoltaic cells may be disposed on a surface of the enclosure.
Figure 4B:
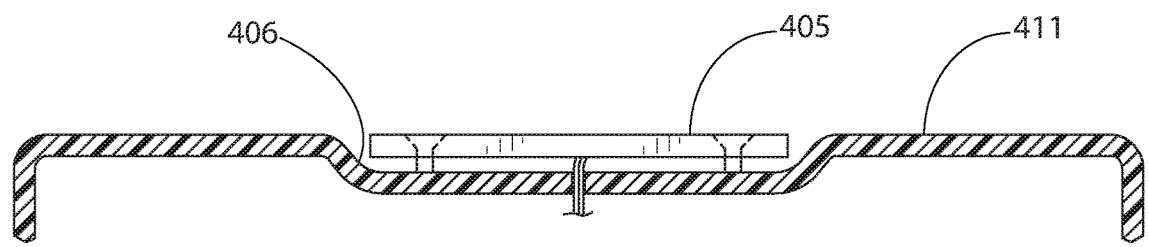

Turning now to the next set of figures, FIG. 4A illustrates a modular tray for customizing the utility of a cargo carrier in accordance with an exemplary embodiment of the present invention, and FIG. 4B illustrates a cross-sectional view thereof depicting one or more solar panels or photovoltaic cells that may be disposed on a recessed surface of an enclosure in accordance with the present invention.

More specifically, FIG. 4A depicts cargo carrier 400, which includes enclosure 410 housing a deployable tray 401. Deployable tray 401 includes a modular tray 402 that may removably couple to a surface of deployable tray 401 via for example snap-in or bolt-in "skids" that may be designed to fit inside deployable tray 401. Modular tray 402 may include protrusions, cavities, apertures, attachments or other functional elements that register with one or more commonly utilized items. For example, and without deviating from the scope of the present invention, modular tray 402 includes apertures 403 and 404. In one non-limiting example, apertures 403 may be shaped so as to fit universally accepted containers of paint—for example a typical 5-gallon container. As such, a painter or working individual may utilize modular tray 402 to carry their paints to certain jobs. Similarly, apertures 404 may be useful as tool compartments, etc.

For example, contractor modular trays may be highly customizable and re-configurable, based on the needs of each job. This may be accomplished by using latch-in or bolt-in "skids" that fit into the trays. The modular trays may take up the entire length of a deployable tray, or just a portion, to allow for multiple modular trays on a single deployable tray. Attachment features may be incorporated at regular intervals to allow maximum flexibility in configuring the deployable tray with the modular tray. For example, a painting tray may include modular trays for holding five-gallon paint buckets, made of molded plastic, like cupholders (such as apertures 403). Each modular tray for this purpose may hold two to four five-gallon buckets in a side by side configuration. Depending on the needs of the job, multiple trays may be snapped into the deployable tray.

In other embodiments, other components may be provided for such as registering components that hold spool-wire. For example, for electricians, modular trays may accommodate spools of wire that are similarly configurable to the deployable tray. Other modular trays may have multi-deep-drawer cabinets for storing large quantities of the various connectors, and or components often used in that trade.

Moreover, in the shown embodiment of carrier 400, enclosure 410 includes a plurality of photovoltaic cells exposed on an exterior surface 411 of the enclosure 410 and coupled to the rechargeable battery (not shown) of carrier 400. As depicted in FIG. 4B, some embodiments of enclosure 410 may include a recessed cross-section 406 within which one or more solar panels or photovoltaic cells 405 may be disposed in a manner so that it is flush with a top surface 411 of the enclosure 410. Naturally, such embodiment is depicted here for illustrative purposes, and it is understood that other embodiments described herein or possible per the present disclosure may also include a plurality of solar panels in the manner shown in FIG. 4A and FIG. 4B.

As such, different possibilities including implementation of solar cells and or modular trays may be offered to consumers with diverse needs. Solar panels would minimize having to recharge a battery supplying power to the components of the cargo carrier. Modular trays not only help to organize storable items but maximize a storage space within cargo carrier 400. The next exemplary embodiment achieves a similar goal but utilizing an interior frame and clamp system.

Figure 5A:
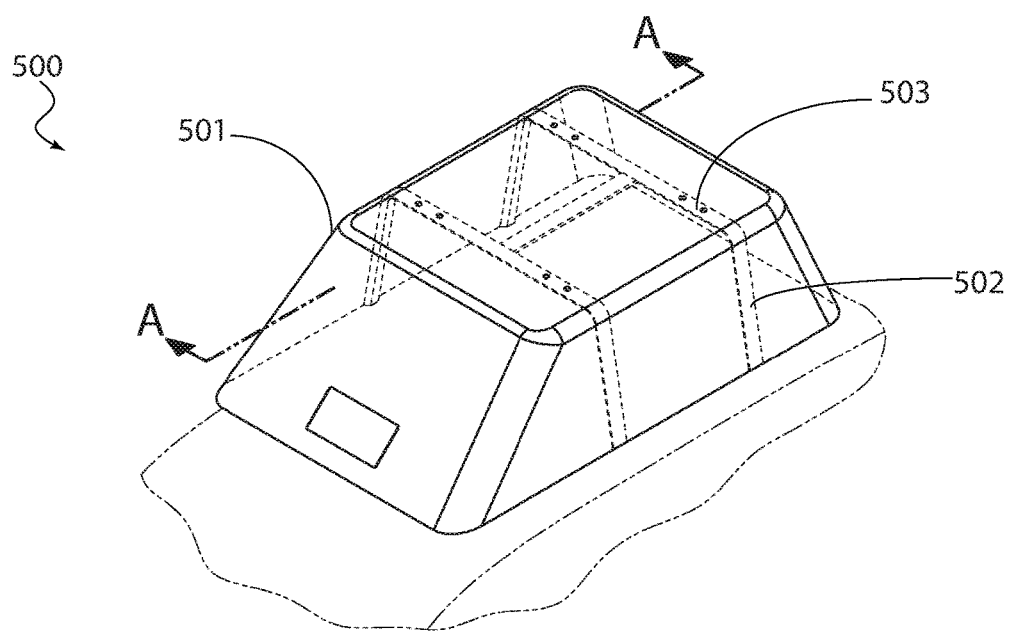
FIG. 5A-5B illustrate an internal rack or frame customizing the utility of a cargo carrier in accordance with an exemplary embodiment of the present invention.
Figure 5B:
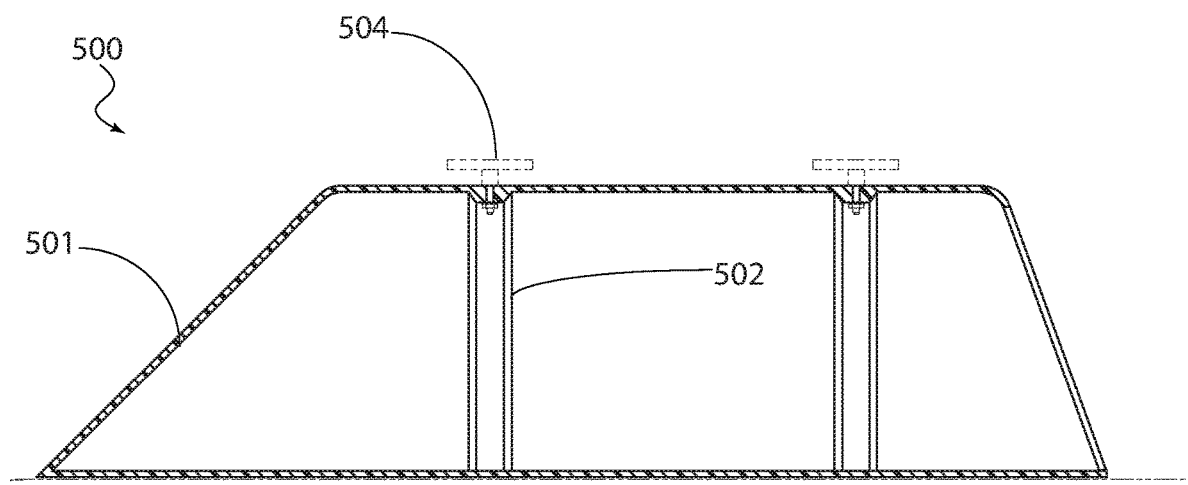

FIG. 5 illustrates an internal rack or frame customizing the utility of a cargo carrier in accordance with an exemplary embodiment of the present invention. More specifically, cargo carrier 500 is shown including enclosure 501, which comprises an internal rack or frame 502 to which attach points 503 may be incorporated in order to hold certain items such as skis, snowboards, surfboards, etc. In exemplary embodiments, frame 502 comprises an internal structure that is separate from enclosure 501, however in other exemplary embodiments, frame 502 comprises an integral frame such as support ribbing and or added wall thickness of interior portions of enclosure 501. In some exemplary embodiments, attach points 503 may be situated on the top and sides of enclosure 501 for accommodating skis, surfboards, etc. Attach points 503 may be supported by internal stiffening bands that increase the thickness of enclosure 501's material in two or more circumferential bands on the interior of the enclosure; in exemplary embodiments, the bands on the interior of the enclosure approximately double the thickness in these areas, as compared to the remaining enclosure thickness. The bands may support additions of automated "C" clamps that are configured to bolt 504 through enclosure 501 as necessary to carry equipment on the side and or top of the enclosure.

In some exemplary embodiments, such clamps may be of a modular design so that different equipment widths and depths may be accommodated. In exemplary embodiments, such clamps may automatically lock and unlock; this may be achieved with interior wiring communicating these components to a control circuitry of cargo carrier 500, in a manner understood by a person of ordinary skill in the art. These features take advantage of the fact that the enclosure is of sturdy unibody construction and opens only from the rear. Equipment, therefore, may be securely attached, loaded and unloaded from the top side surfaces of enclosure 501 without impeding the loading and unloading of interior contents.

Figure 6A:
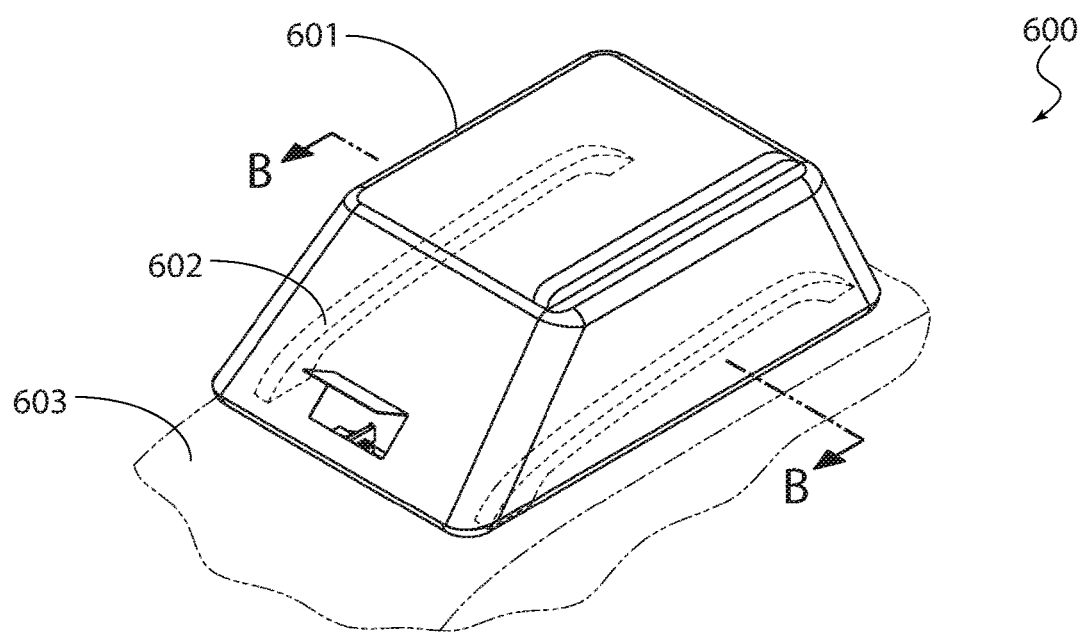
FIG. 6A illustrates a perspective cross-sectional view of a cargo carrier fitted over a vehicle rack or roof rack system, in accordance with an exemplary embodiment of the present invention.
Figure 6B:
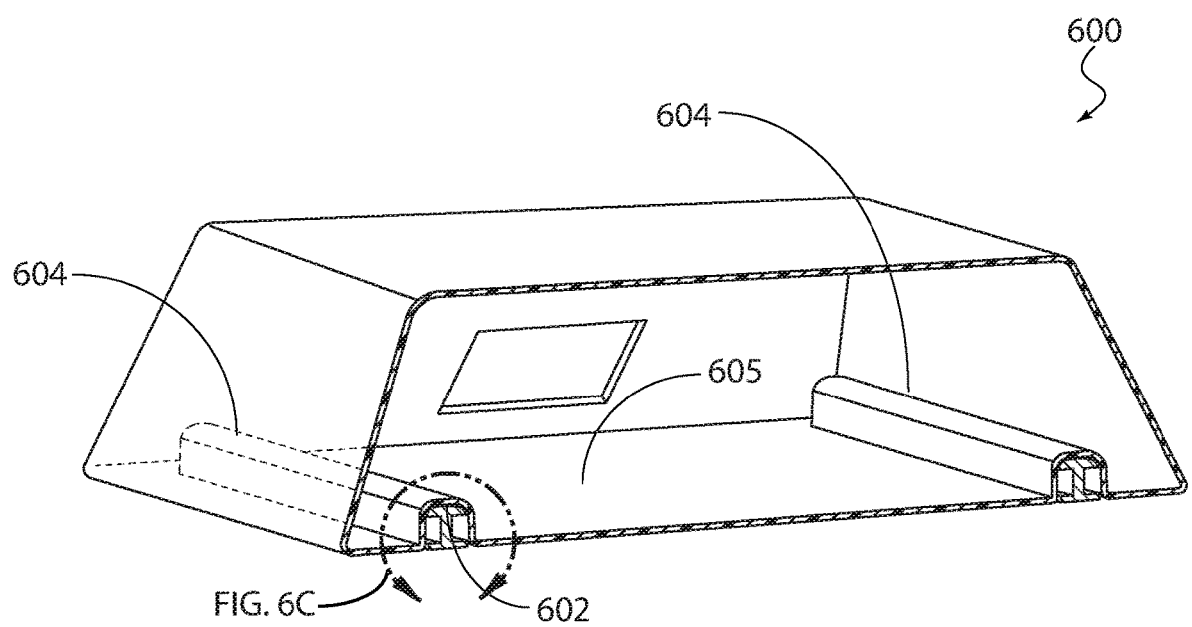
FIG. 6B illustrates a cross-sectional view of the enclosure on the cargo carrier depicted in FIG. 6A.

Turning now to the next figures, FIG. 6A illustrates a perspective view of a cargo carrier fitted over a vehicle rack system, in accordance with an exemplary embodiment of the present invention; and FIG. 6B illustrates a cross-sectional view of the enclosure on the cargo carrier depicted in FIG. 6A. More specifically, these figures depict cargo carrier 600, which comprises enclosure 601. These figures exemplify how an enclosure in accordance with the present invention may conform to a vehicle's roof as mentioned above. Vehicle 603 is shown with longitudinal rails 602 on its roof, which fit inside recessed channels 604 formed along a bottom surface 605 of enclosure 601 such that each longitudinal rail 602 of vehicle 603's roof rack sits snuggly therein. In this exemplary embodiment, recessed channels 604 each protrude or extend toward an interior of the enclosure 601.

In this manner, enclosure 601 better conforms to the vehicle's roof. These recessed channels 604 accommodate the longitudinal rails of the car's roof rack. In exemplary embodiments, recessed channels 604 sit approximately flush with the roof of the vehicle instead of 6" or more above the roof like known prior art devices; as mentioned above, this helps achieve a more integrated design while significantly reducing wind drag and turbulence. Recessed channels 604 also provide for more rigid and secured attachment, since cargo carrier 600 is attaching directly to the (typically) factory installed longitudinal rails (which are attached directly to the roof), as opposed to prior art devices that typically attach to cross-rails, which are then attached to the longitudinal rails and are therefore more prone to more vibration.

Figure 6C:
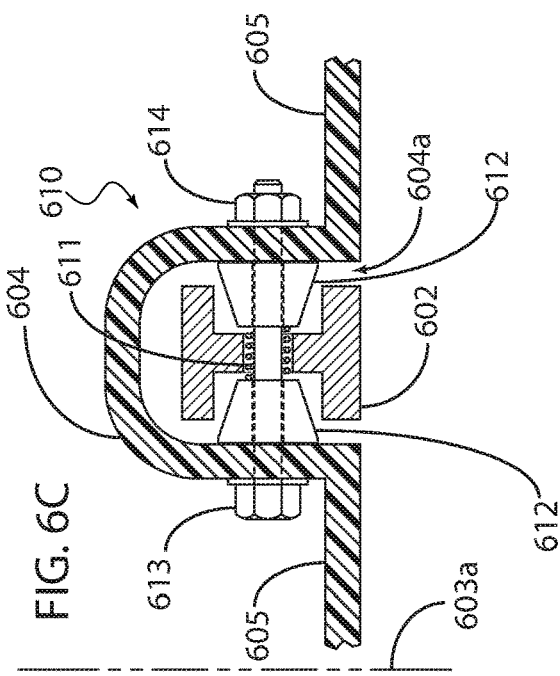
FIG. 6C illustrates a cross-sectional view of a rear attachment for an enclosure in accordance with an exemplary embodiment of the present invention.

Notably, in the view of FIG. 6B, the actuators that tilt the enclosure are not shown for the sake of better depicting the characteristics of recessed channels 604. However, the following figure depicts an exemplary embodiment of rear attachment points that allow enclosure 601 to be tilted as discussed above and with reference to other embodiments. More specifically, FIG. 6C illustrates a cross-sectional view of a rear attachment point tiltably coupling the enclosure 601 to a rear portion of a vehicle roof rack or rail 602, in accordance with an exemplary embodiment of the present invention. In the view of FIG. 6C, the rear attachment points of enclosure 601 are shown (i.e. along a line opposite to line B-B such that the cross-sectional view is looking towards the rear of the enclosure 601. In this exemplary embodiment, one of the two recessed channels 604 formed along a bottom surface 605 of enclosure 601 is tiltably coupled to one of the rails such that one of the longitudinal rails 602 of vehicle 603's vehicle rack sits completely within a cavity 604*a* created in part by recessed channel 604 and vehicle 603's roof. To facilitate the enclosure 601 to tilt or rotably move between a leveled position and a tilted position, rear attachment point 610 may employ several components such as a spring 611, one or more conical washers 612, a shoulder bolt 613 and shoulder nut 614. In this embodiment (and as may be also appreciated from FIG. 6B), there is a short distance or space between recess 604 and a side wall of enclosure 601 connected by a portion of bottom surface 605. For illustrative purposes, line 603*a* depicts an exemplary proximity between enclosure 601 and a side edge of vehicle 603's roof.

Moreover, as can be appreciated from this view, in this embodiment recessed channel 604 includes a C-shape or even u-shaped construction that completely encompasses or enclosed rail 602 therein. In an alternative embodiment discussed with reference to the next figure, a differently shaped recessed channel 604 may be employed.

Figure 6E:
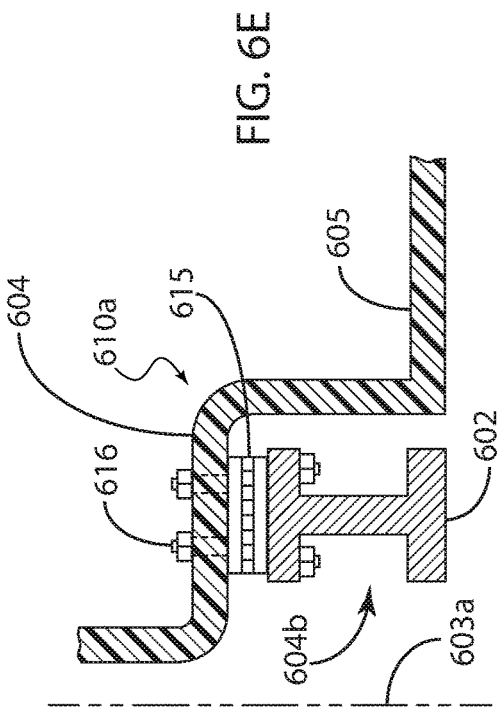
FIG. 6E illustrates a cross-sectional view of a rear attachment for an enclosure in accordance with an exemplary embodiment of the present invention.
Figure 6D:
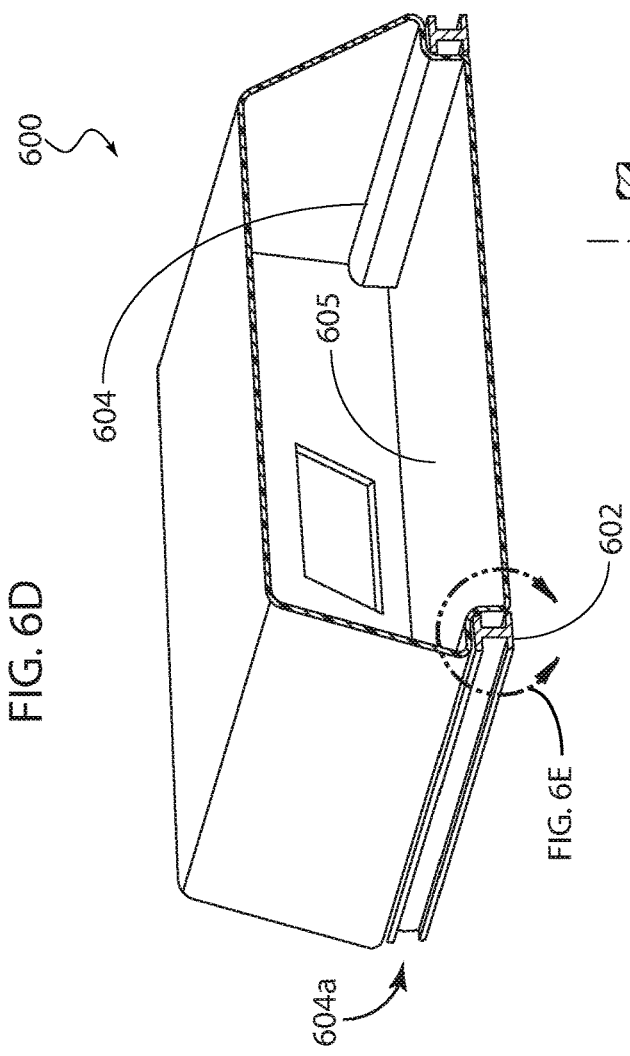
FIG. 6D illustrates a perspective cross-sectional view of a cargo carrier fitted over a vehicle rack system, in accordance with an exemplary embodiment of the present invention.

Turning now to the next figure, FIG. 6D illustrates a perspective cross-sectional view of a cargo carrier fitted over a vehicle rack system, in accordance with an exemplary embodiment of the present invention; FIG. 6E illustrates a close-up cross-sectional view of a rear attachment for an enclosure in accordance with an exemplary embodiment of the present invention. This embodiment may be suitable for some of the newer SUVs that employ longitudinal rails which are located close to the side edges of the vehicle, making it impractical to fully encompass them within the recessed channels 604 of the embodiment of FIG. 6C. In the embodiment of FIG. 6D, recessed channels 604 may include an alternative enclosure that has indentations or lips to accommodate the longitudinal rails, having instead of an all-encompassing cavity 604*a*, a cavity 604*b* that exposes rail 602. To these ends, recessed channel 604 includes a half c-shape or step shape that exposes the rail 602. To facilitate the enclosure 601 to tilt or rotably move between a leveled position and a tilted position, rear attachment point 610*a* may employ several components such as a hinge 615 and one or more bolts and washers 616. In this embodiment (and as may be also appreciated from FIG. 6E), there is a no distance or space between recessed channel 604 and a side wall of enclosure 601.

Although several embodiments have been disclosed above with reference to the figures, other embodiments may be possible without limiting the scope of the present invention. For example, although certain types of motors, components and materials are discussed above, a person of ordinary skill in the art will appreciate that different purposes may call for different types of components such as different materials stronger or more efficient motors, actuators, etc. For heavy duty loads, wherein a cargo carrier in accordance with the present invention is used for professional purposes (i.e. as opposed to recreational or everyday use), motors, actuators and all associated mechanical hardware may be heavier duty than those specified for a consumer version.

Similarly, certain designs may be implemented for other purposes. By way of a non-limiting example, a deployable tray utilized by a contractor may implement a dual, side-by-side tray or multiple horizontal tray system. In such embodiments, each tray may be operated independently, so therefore, each tray may require its own motor, rack and pinion. In such embodiments, each tray may be made out of aluminum instead of plastic, in order to support the added weight, wear and tear. Moreover, the heavier loads may require a telescoping tension tube or spooled tensioner cable to counteract the bending moment associated with a loaded tray when extended from the enclosure. In some exemplary embodiments, these tensioners may be mounted to the insides of the enclosure and the aft ends of the sides of the tray. Typically, embodiments in which multiple horizontal trays may be employed may comprise embodiments for cargo carriers coupled to trucks such as pickup trucks, given that enclosures to those carriers may have as much as twice the height as cargo carriers adapted to couple to a roof of a vehicle.

As mentioned above, although the embodiments shown in the figures largely focus on a cargo carrier that may be installed on a roof of a vehicle, other configurations may be possible. By way of a non-limiting example, in some embodiments a cargo carrier may be coupled to a pick-up truck. In such exemplary embodiments, an enclosure may rest on the front and side walls of a pickup truck bed. The enclosure may include channels to accommodate the sides of the bed, much like the above embodiments include recessed channels to accommodate the longitudinal rails of a roof rack. The front face of the shell may be optionally flat and parallel to the back of the cab of the pickup, and the aft face may be contiguous and tangent to the plane of the tailgate. The bottom of the enclosure may be parallel to the bed of the pickup and at the level of the top of the sides of the bed. In such exemplary embodiments, the enclosure may not require lifting or tilting, but may have accommodations for lifting if attached. Similarly, in other exemplary embodiments, deployable trays may slide out of the enclosure sideways rather through a rear opening.

In yet other exemplary embodiments, a double decker, or two-drawer enclosure, with a lower deck and a drawer having the geometry of the embodiment of FIG. 2, and an upper (cabover) deck's front plane contiguous and tangent to the windshield plane, and the aft face parallel and contiguous with the tailgate. In such exemplary embodiment, two rear access doors (one rear hatch per drawer) may be implemented, or one larger access door that covers both levels may be incorporated instead. In such embodiments, actuators may be employed.

In yet another embodiment, no enclosure is provided, but rather a deployable tray is provided, which may be slidably housed and or secured to an interior support structure of a vehicle. Such exemplary embodiment may include a conveyor mechanism as previously described above. In such embodiment, the deployable tray may be housed in a lightweight aluminum frame of tubular construction. For vans, the frame may attach to the vehicle using four telescoping shafts terminating in suction cups that press up against the interior sidewalls of the vehicle. For vans, the frame may bolt to the floor. Since in such embodiment, the deployable tray will be contained inside the vehicle, a controller for the deployable tray may draw power from an auxiliary power of the vehicle rather than a battery pack. Such embodiment would not require a lift or tilt system, since the deployable tray will be operating at the floor level of the back of the van or SUV (i.e. already at approximately waist height or lower).

In yet other exemplary embodiments, the cargo carriers may be "stackable", using tubular aluminum columns, approximately 2" square, which are perpendicular to the floor plane and are attached to the sides of a deployable tray frame. The columns terminate in flat pads, approximately 3"

square, which are capable of being bolted to the floor of the vehicle and to a second frame that is stacked on top of it. These exemplary cargo carriers may also incorporate an option for a 'false floor" that covers the device when not in use. This cover may be rigid plastic, tri or four-folded, with the folds parallel to the length of the vehicle. The covers may be designed to accurately fit the interior of specific vehicle models and would typically be used in conjunction with a "single stack" device. The cover may attach to the column pads in a similar fashion as a double stack would. These latter described embodiments may like implement a dual deployable tray system and heavier duty modular trays, actuators and motors.

Turning now to the next set of figures, FIG. 7A-7B illustrate a cargo carrier in accordance with an exemplary embodiment of the present invention, which includes some of the elements and or configurations briefly discussed in the preceding paragraphs. More specifically, these figures depict pickup truck 711, which has been retrofitted with carrier 700.

Carrier 700 may exemplarily include enclosure 701, which is coupled to a bed of pickup truck 711 at a front end 707 via actuator arms 704a of actuators 704, and at a rear end 708, typically via hinged attachment fittings that enable enclosure 701 to pivot or tilt in a manner such that deployable tray 702 may be deployed or slid out of enclosure 701 to make contact with the ground. In exemplary embodiments, deployable tray 702 is configured to touch the ground in order to facilitate the loading of heavy equipment.

Although the principal of operation is similar to the embodiments disclosed with reference to other figures, in this exemplary embodiment, the added space of enclosure 701 further allows for implementation of multiple deployable trays. For example, and in no way limiting the scope of the present invention, deployable tray 702 may be a first deployable tray, and deployable tray 703 may be a second deployable tray suitable for added storage.

Each deployable tray 702 and 703 may use similar or different deploying systems. For example, and without limiting the scope of the present invention, deployable tray 702 may include a system similar to that of FIG. 2C in which a driving component such as a rack and pinion or ball screw component may be utilized to deploy the tray. Similarly, deployable tray 702 may ride on and be supported by a set of tracks 706. Deployable tray 703 may be deployed via actuators (not shown) that slide the tray out and back inside enclosure 701 supported or guided on tracks 705. Access to an interior of enclosure 701 may be via multiple access doors as mentioned above, or a via single access door 710 that movably secures an access opening 709 providing access to deployable trays 702 and 703. Notably, in the embodiment shown in FIG. 7A-FIG. 7B, actuators 704 are positioned outside or at an exterior of enclosure 701. However, in other embodiments, actuators 704 may be installed in an interior of enclosure 701.

Figure 7C:
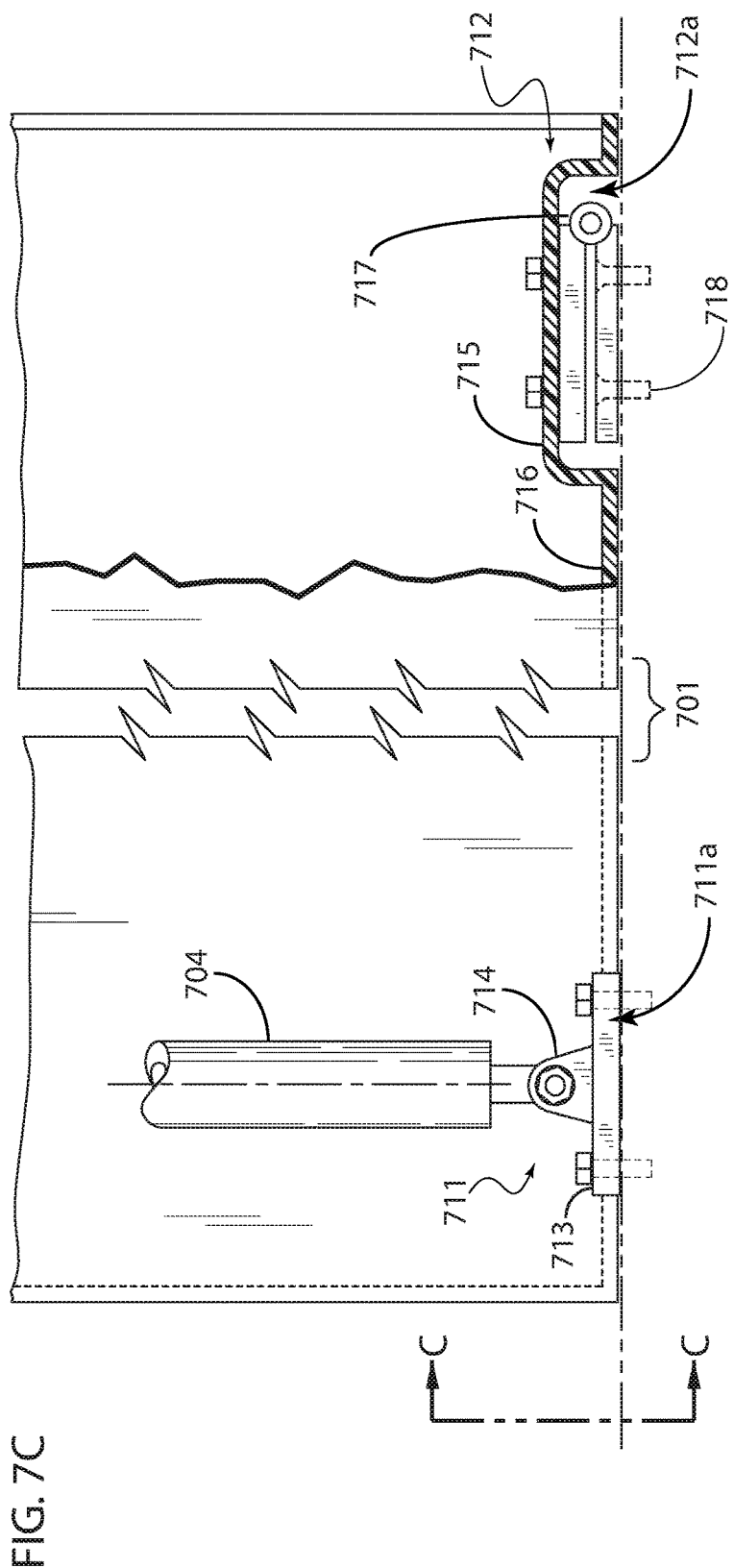
Figure 7D:
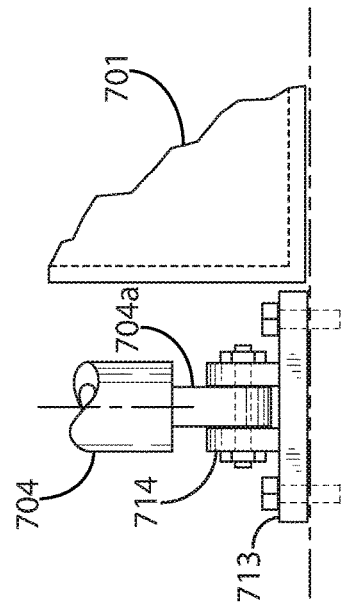

Turning now to the next figures, FIG. 7C-7D illustrate exemplary front attachment point 711 and rear attachment point 712 in accordance with the present invention. In this exemplary embodiment, front attachment points 711 may include a base 713 that includes two protruding eyelets 714, which attach the lower end of the lifting actuator 704 and more specifically actuator arm 704a through an opening 711a at the front end 707 of the enclosure 701. The lower end of the actuator bolts to an attach plate that bolts to the bed of the pick-up. FIG. 7D specifically shows a front view of front attachment point 711 along line C-C. As may be appreciated from these figures, actuator 704 and front attachment points 711 are situated exterior to enclosure 701, however as mentioned above in other exemplary embodiments, these components may be housed within enclosure 701.

In this exemplary embodiment, aft or rear attachment points 712 may include a protrusion 715 on a bottom inner surface 716 of enclosure 701 that forms a cavity 712a for housing a hinge 717 that is configured to tilt enclosure 701 whenever actuators 704 are activated. In an exemplary embodiment, hinge 717 is coupled to a bed of the truck 711 via one or more bolts 718.

Figure 8A:
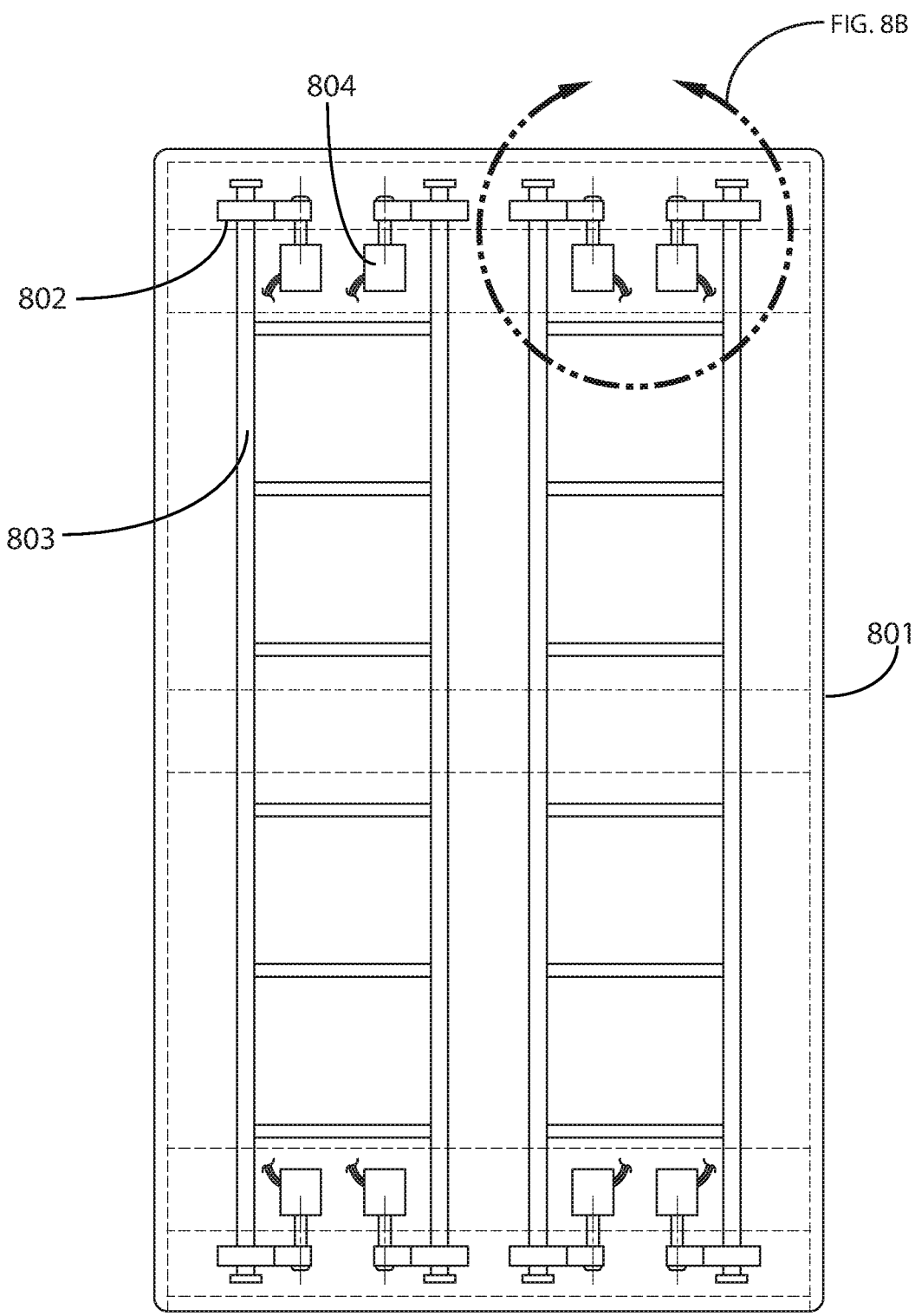
FIG. 8A-8D illustrate a cargo carrier in accordance with an exemplary embodiment of the present invention.
Figure 8B:
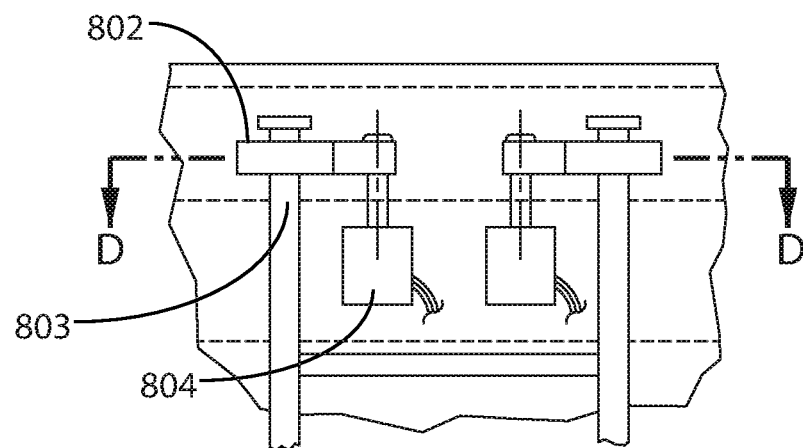
Figure 8C:
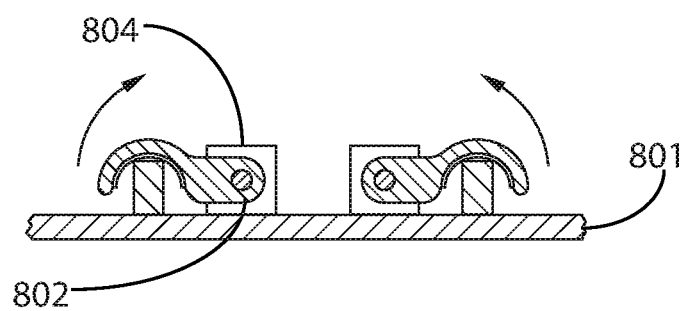
Figure 8D:
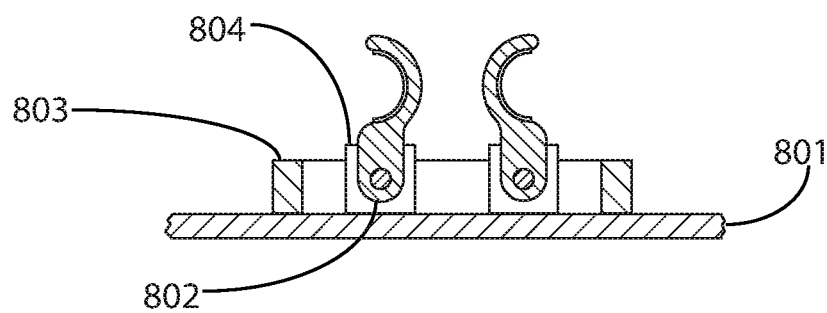
Figure 9:
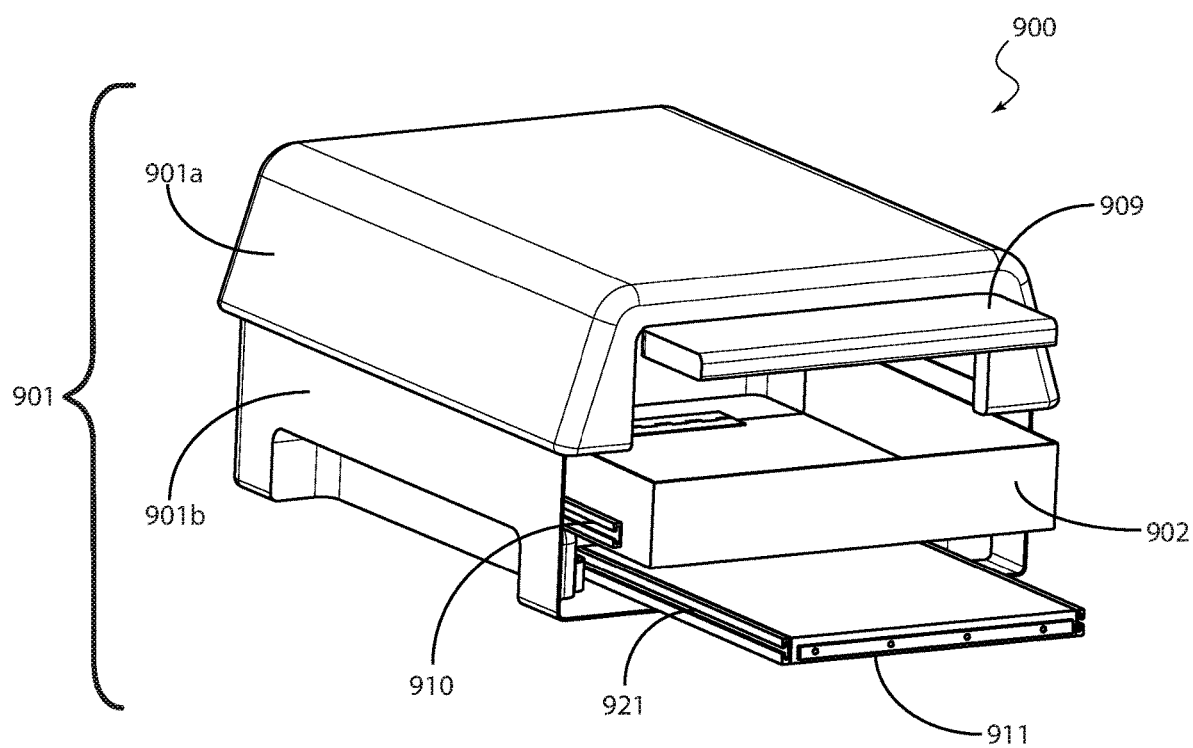
FIG. 9-12 illustrate a cargo carrier in accordance with an exemplary embodiment of the present invention, which includes a top shell portion and a bottom shell portion that may be integral as a single shell.
Figure 10:
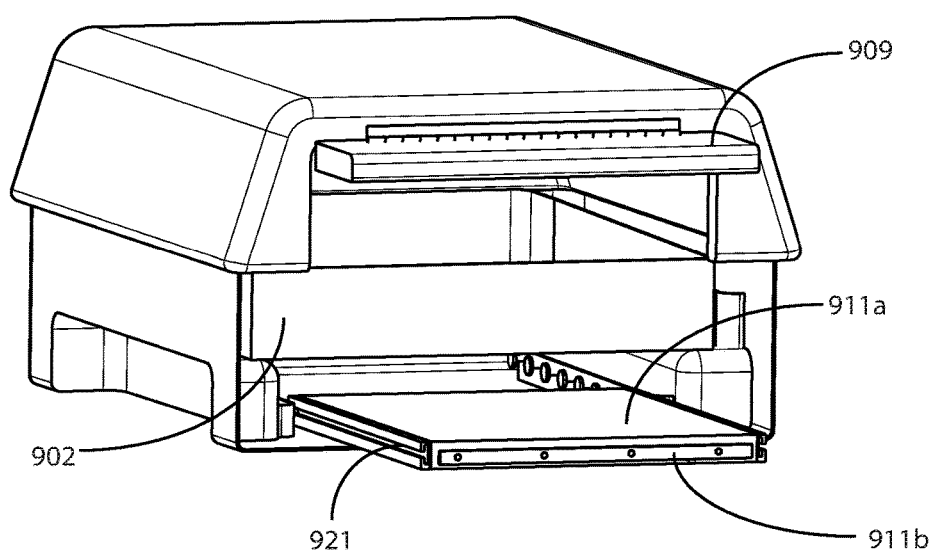
Figure 11:
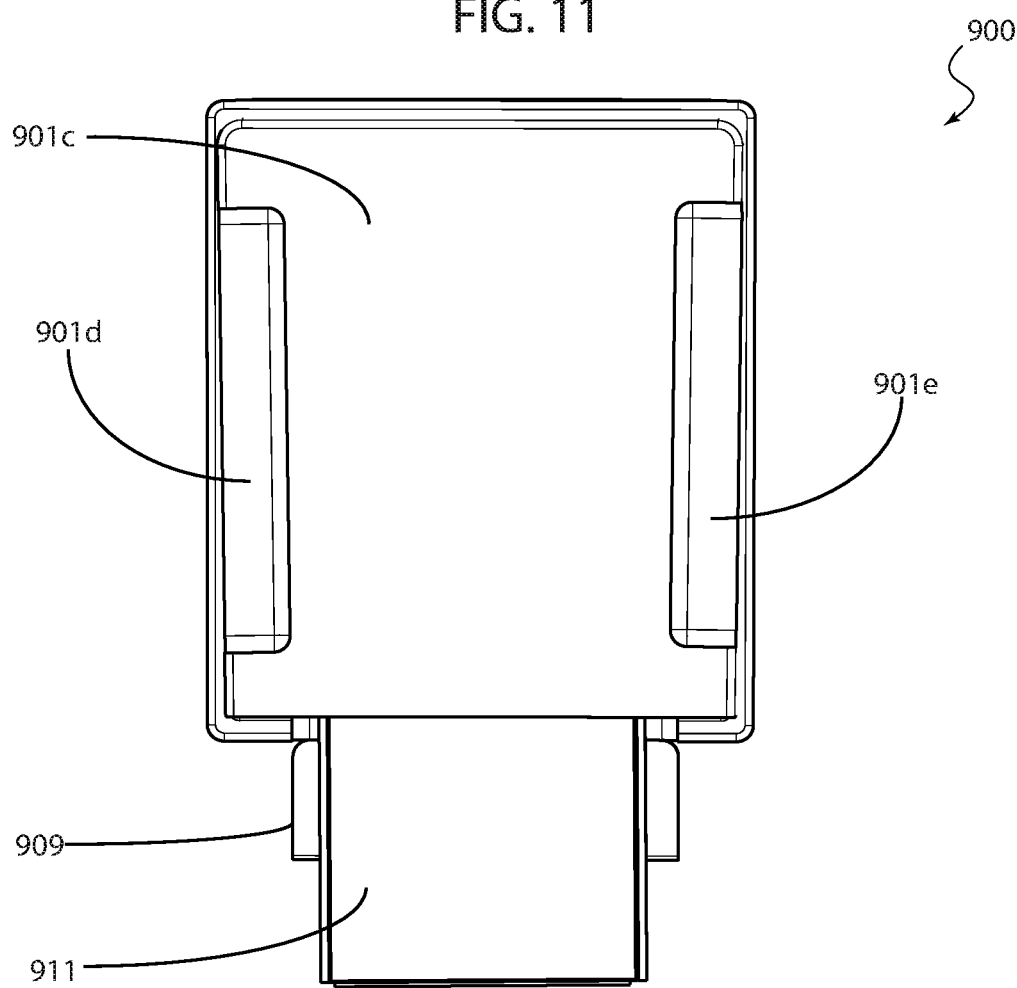

Turning now to the next set of figures, FIG. 8A-8D illustrate a cargo carrier in accordance with an exemplary embodiment of the present invention. More specifically, FIG. 8A shows a top view of enclosure 801, which includes a plurality of clamps 802 that may be remotely operated via actuators 804. In the shown embodiment, clamps 802 are used to secure a device such work ladders 803; however, clamps 802 may be configured to secure other items including but not limited to sports equipment, luggage or other cargo that may be desirable carried on a top surface of an enclosure in accordance with the present invention. FIG. 8B depicts a close-up top view thereof, and FIG. 8C and FIG. 8D show a cross-sectional view along line D-D depicting a plurality of clamp devices 803 in a secured position and a released position, respectively.

The next set of figures disclose yet another exemplary embodiment suitable for retrofitting the bed of a pick-up truck into a type of mobile workshop. In this exemplary embodiment, a molded structure ("shell") may be configured to fit in the bed of a pickup truck, encompassing the wheel wells. The width of the shell increases at the height of the sides of the pickup bed, whereupon it widens and rests on the top of pickup's side panels. The shell then rises to the height of the cab. The shell may also extend over the cab, which is especially useful in the case of smaller pickup trucks. As in other exemplary embodiments, the shell may be sturdy enough to accommodate attach fittings in order to lash ladders and other equipment to the top and/or sides of the shell.

The interior of the shell may be comprised of one or more trays, whose ingress and egress from the shell may be automated in a similar fashion to other embodiments discussed above. In the following exemplary embodiment(s) as shown and described with reference to FIG. 9-FIG. 42, however, significant additional load support may be provided that may not be possible with a conventional sliding drawer type mechanism. Specifically, in the current invention, the main load bearing tray has attached to the underside folded legs with wheels that may be manually unfolded once the tray is partially extended from the shell. The legs may be unfolded using a hand lever that rotates a shaft linked to a cam that rotates the legs downward so that the wheels touch the ground, supporting the load as the tray extends from the shell. In the preferred embodiment, the folding and unfolding of the legs may be automated by replacing the hand lever with a rotary actuator. The legs may also be telescoping and individually adjustable to allow the trays to remain level on uneven terrain. In the preferred embodiment, the leg extensions may also be automated by replacing the telescoping legs with linear actuators.

The front and sides of the tray may also fold down to transform the tray into a worktable. In an alternative configuration, a separate sliding worktable may be installed below the load tray so that equipment in the load tray needn't be removed in order to have access to a flat and level work surface. The forward face of the worktable is fitted with electrical outlets that are powered by an inverter in the back of the shell.

In order to angle the load tray to enable it to reach the ground, the tray is made in two pieces, with the back segment remaining attached to the shell as the tray egresses. The front segment of the tray (approximately the forward two thirds of the overall length of the tray), is connected to the rear segment with a piano hinge installed across the width of the bottom of the tray. The rear and forward segments of the tray are further connected with sliding deadbolts on the exterior of the two side walls that traverse the gap between the two segments. The front segment has the previously described actuated telescoping wheeled legs attached to the underside of the tray. When the tray needs to be lowered to the ground, the deadbolts are released, and the leg actuators are retracted until the tray touches the ground. The front face of the tray is also hinged, serving as a tailgate to the tray and a ramp for the onboarding of wheeled equipment. The onboarding of heavy equipment may be facilitated by a winch connected to heavy duty lashing rings that are molded into the back face of the shell.

An additional feature which furthers the pickups transformation into a mobile workshop is a retractable awning that slides in and out of the top part of the shell to provide protection from sun and rain while working at the worktable. The awning slides out in a similar fashion as the other trays. It is configured and operates in a similar fashion as the other trays. The awning may also have telescoping legs that fold out.

As described in the previous patent, the trays may contain customized snap-in molded kits customized for various construction or service trades. For example, a painting contractor may require a kit that has "cupholder" accommodations for five-gallon paint buckets; an electrical contractor may require a kit that accommodates spools of wire.

FIG. 9-12 illustrate a cargo carrier in accordance with an exemplary embodiment of the present invention, which includes a top shell portion and a bottom shell portion that may be integral as a single shell. More specifically, FIG. 9-12 depict cargo carrier 900, which generally comprises of an enclosure 901 including fittings configured to couple the enclosure 901 to a truck bed; a first deployable tray 902, slidably housed within the enclosure 901, the first deployable tray 902 including a tiltable surface 903 (as will be defined in more detail below); one or more actuators, including: at least one actuator 904 adapted to extend and retract the first deployable tray 902 outside and inside the enclosure 901, respectively; and at least one actuator 905 adapted to tilt the tiltable surface 903 of the first deployable tray 902; and a controller 906 in communication with the one or more actuators and configured to: activate the one or more actuators to slide the first deployable tray 902 outside of the enclosure 901; and activate the one or more actuators to tilt the tiltable surface 903 of the first deployable tray 902 (see for example, the block diagram of FIG. 13).

In some exemplary embodiments as shown in these views, the cargo carrier may include an enclosure 901 that is a single-piece molded shell or enclosure, having a top shell portion 901a and a bottom shell portion 901b, defined by a front wall, side walls, a top surface, a bottom surface and a rear access door 909 opposite to the front wall of the enclosure, the enclosure further including fittings configured to couple the enclosure to a truck bed. This may be achieved via tracks 910 along a side wall of the deployable tray 902 that register with complementary tracks situated in the interior walls of enclosure 901. The deployable tray 902 is typically slidably housed within the enclosure 901 and includes tiltable surface 903, which is typically the interior upper surface of the tray that is closest to the hatch or door 909 of the enclosure 901. In exemplary embodiments, the one or more actuators 904, 905, 907, and 908, are house within the enclosure 901.

By way of illustration only, and in no way limiting the scope of the present invention, at least one actuator 904 housed inside the enclosure may be adapted to extend and retract the deployable tray 902 outside and inside the enclosure 901, respectively. Similarly, least one actuator 905 may be coupled to a surface of the deployable tray 902 and adapted to tilt the tiltable surface 903 of the deployable tray 902 (see also FIG. 18, FIG. 27, and FIG. 35 (for example) which discuss the tilting mechanism with reference to some exemplary embodiments of the present invention). The controller 906 is typically coupled to or in communication with the one or more actuators 904, 905, 907, and 908, wherein the controller 906 is configured to: activate the one or more actuators to slide the deployable tray 902 outside of the enclosure, and activate the one or more actuators to tilt the tiltable surface 903 of deployable tray 902.

In some exemplary embodiments, such as the one depicted in these set of figures, cargo carrier 900 may further comprising a second deployable tray 911. Generally, the one of the deployable trays, for example deployable tray 902, is a tray comprising a compartment area at least partially enclosed by side walls, similar to a drawer that may be slid inside enclosure 901 for storage or extended outside of enclosure 901 in order to allow access to the items stored within the deployable tray 902. In exemplary embodiments, the second deployable tray may be a smaller or similar tray to tray 902. In some exemplary embodiments, as shown in these figures, the second deployable tray 911 may be a flat tray without a compartment section, but which provides a flat working surface area 911a. In some exemplary embodiments, deployable tray 911 may include accessories such as a power strip 911b or power supply module for allowing access to auxiliary power. This may be useful for tools or other accessories that user may want to power during use.

Enclosure 901 is configured to couple to a bed of a pickup truck, thus typically a bottom region 901c of the enclosure 901 will include sections 901d and 901e that are adapted to contour or register with the wheel wells of a pickup truck. This may be appreciated, for example, from the views of FIG. 11 and FIG. 12, which respectively illustrate cargo carrier 900 from a bottom view and rear view.

Figure 12:
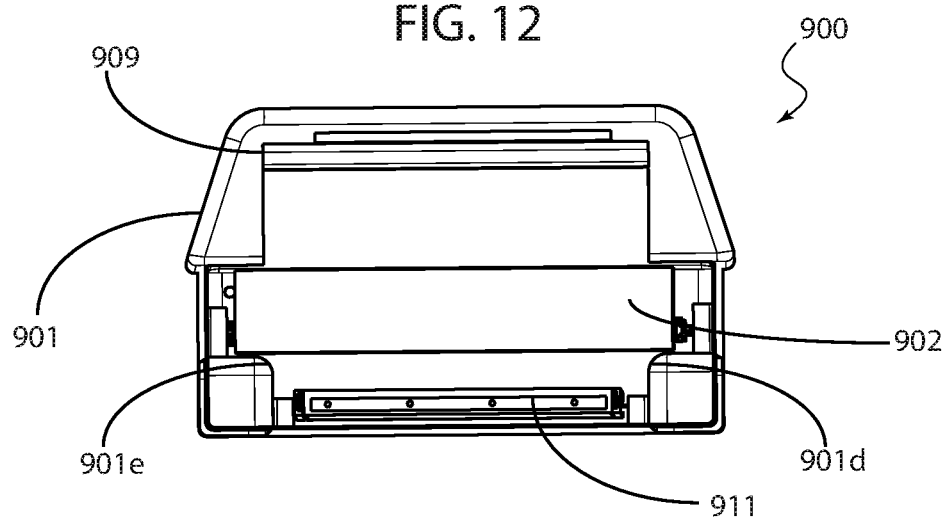
Figure 13:
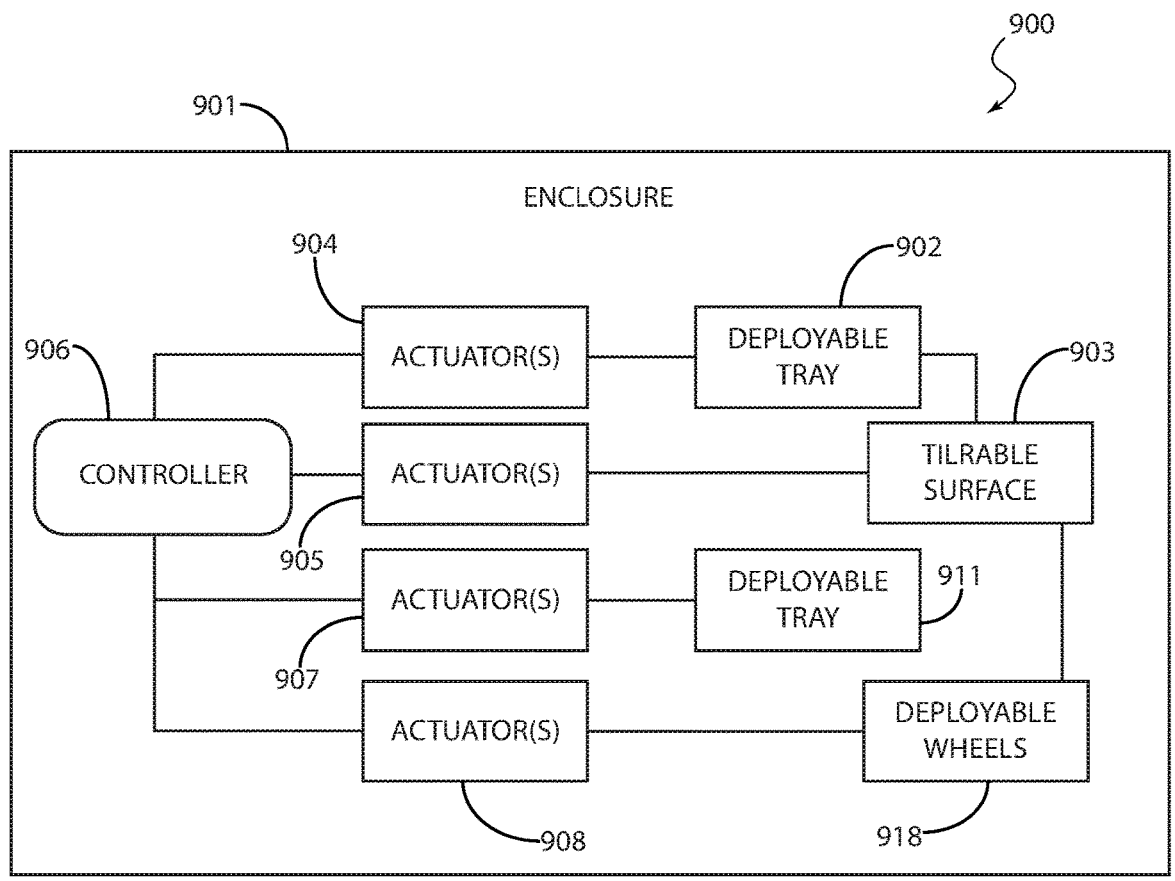
FIG. 13-15 illustrate a cargo carrier in accordance with the exemplary embodiment of FIG. 12, shown coupled to or installed on a bed of a truck.
Figure 14:
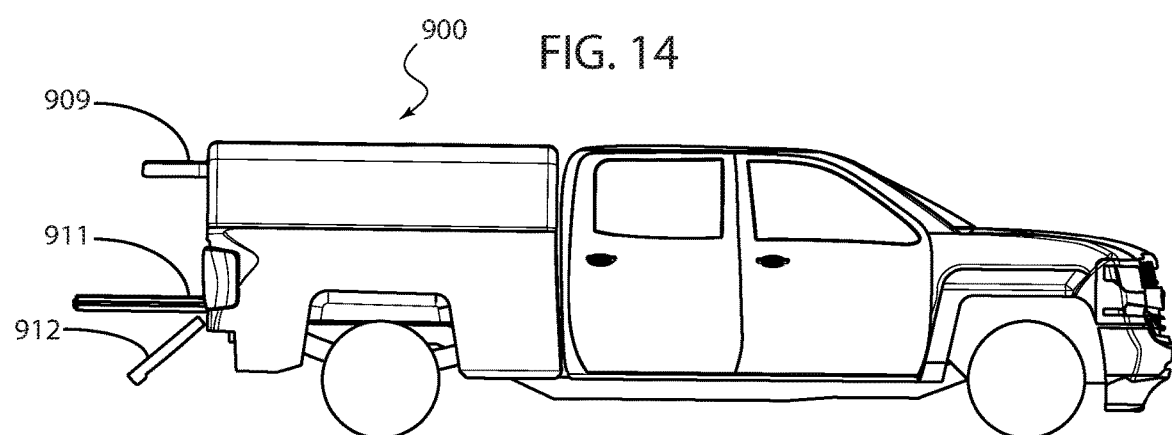
Figure 15:
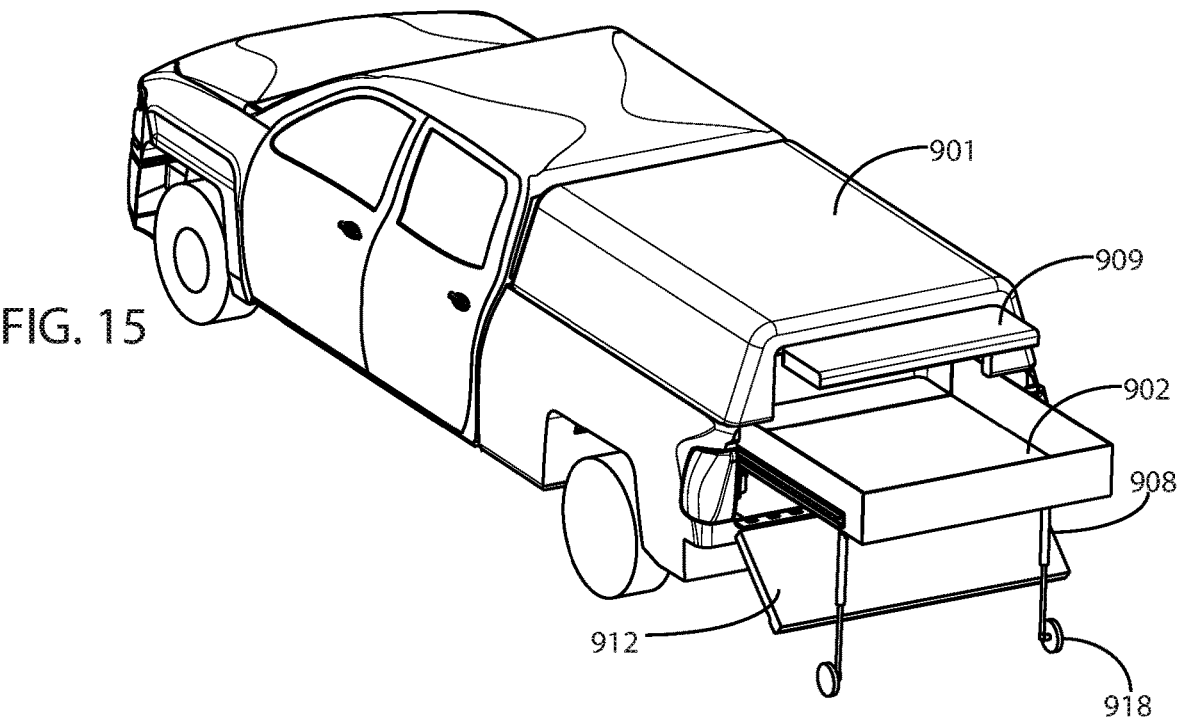

Turning now to the next set of figures, FIG. 14-15 illustrate a cargo carrier in accordance with the exemplary embodiment of FIG. 12, shown coupled to or installed on a bed of a truck. More specifically, these figures illustrate isometric and top views of the cargo carrier 900 installed in the bed of a pickup truck. FIG. 14 shows the cargo carrier enclosure 901 with its tailgate door 909 opened and the main deployable tray 902 hidden from this side view or rather stored within the enclosure 901 extending from the enclosure. Moreover, in this view of FIG. 14, the pickup truck's tailgate door 912 is opened too so as to allow for deployable tray 911 to be extended, as shown.

FIG. 15 shows the cargo carrier enclosure 901 with its tailgate door 909 opened and the main deployable tray 902 now extending outside and from within the enclosure 901. The enclosure 901 may be fastened to the vehicle at various locations in the bed and/or along the top of the sidewalls of the pickup truck bed. The enclosure 901 may house one or more additional deployable trays that serve various functions, a power supply 911b and one or more actuators as discussed above. In some exemplary embodiments, for example in version in which the shell is not a single-molded piece but rather formed of different components, the enclosure 901 is comprised of an upper shell 901*a* and a lower shell 901*b* that are not molded in one piece. Note: in this description, the terms upper or top shell portion, or upper or top shell, may refer to either a separate top part that forms the enclosure, or a top region of a unitary enclosure, single-piece enclosure. Similarly, the terms lower or bottom shell portion, or lower or bottom shell, may refer to either a separate bottom part that forms the enclosure, or a bottom region of a unitary enclosure, single-piece enclosure.

The upper shell 901*a* is defined by a front surface and two side surfaces, a top surface, bottom surface, and rear surface. The front surface is typically parallel to and approximately coincident with the rear of the pickup cab. The top surface is typically parallel to and approximately coincident with the roof of the pickup cab, but may extend over the cab to make use of space above the cab. The side surfaces are typically parallel to and approximately coincident with the exterior of the side panels of the truck. The bottom surface is essentially a lip that is parallel (i.e., horizontal) to the top surface of the pickup truck bed's side walls (and is of the same approximate width) and rests on that surface. The rear surface is parallel and approximately coincident with the tailgate of the pickup truck. The rear surface is cutout to accommodate an access door 909. The access door 909 may be hinged across the top with a piano hinge or other such hinge type which enables the access door to open horizontally and upwardly. In some exemplary embodiments, access door 909 may be automated by attaching two bi-directional linear actuators on either side of the door. Access door 909 may include electric locks attached either to the sides or the bottom of the upper shell 901*a* and may be operated remotely. In some exemplary embodiments, the access door 909 may include a sealing component or rubber grommet to prevent leakage of water into the enclosure 901.

Turning now to the next set of figures, FIG. 16-21 illustrate cargo carrier 900, shown without the top shell portion of the integral shell for illustrative purposes, or alternatively, for embodiments in which the enclosure is a multiple piece enclosure, the lower shell shown detached from the top shell.

More specifically, from these views, it may be appreciated that the lower shell 901*b* consists of a front surface, two side surfaces and a bottom surface that are generally defined by the walls and floor of the pickup bed. The sides and floor surfaces are indented to accommodate the wheel wells of a pickup truck. The rear of the lower shell 901*b* is open to accommodate the tailgate of the pickup truck when the tailgate is closed. If the enclosure 901 is made in two pieces the lower shell 901*b* will also include a horizontal lip at the upper surface that is parallel to and rests on top of the lip previously described in the upper shell 201. In instances where the enclosure 901 is made in two pieces, the lips of the upper shell 901*a* and lower shell 901*b* may be spot-welded or otherwise fastened to each other to secure the upper shell 901*a* to the lower shell 901*b* before installation into the bed of the truck.

Figure 16:
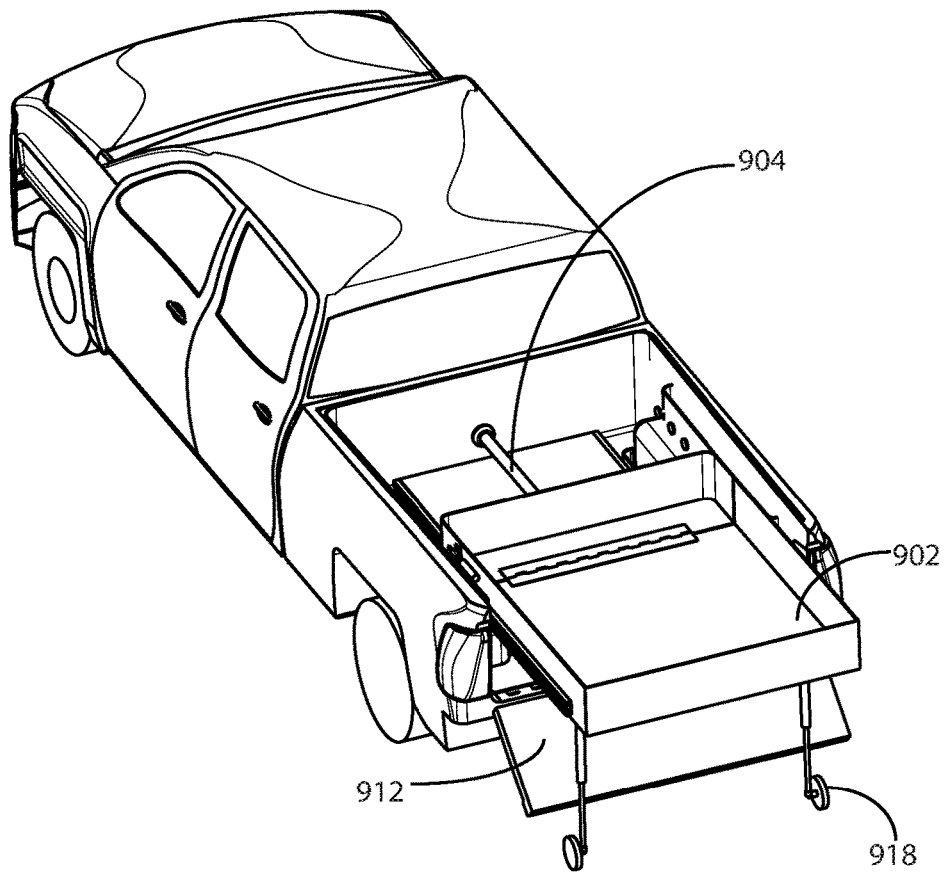
FIG. 16-21 illustrate a cargo carrier in accordance with the exemplary embodiment of FIG. 12, shown without the top shell portion of the integral shell for illustrative purposes.
Figure 17:
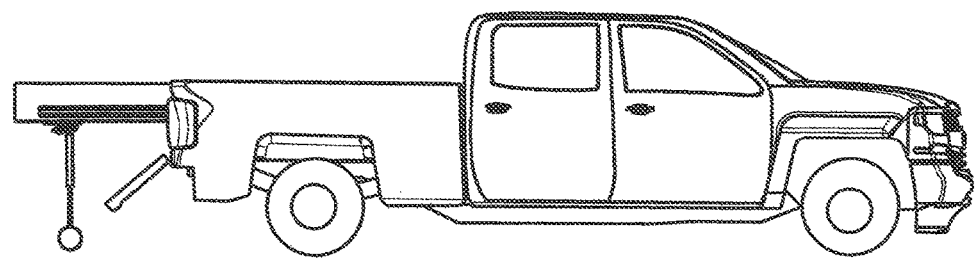

In FIG. 16, as well as FIG. 15, it may also be appreciated that tray 902 may include deployable wheels 918 that extend downwardly so as to provide support to the tray when it is extended horizontally and generally parallel to the ground as shown in these views. FIG. 17 is a side view of the truck with cargo carrier 900 shown in FIG. 16. As mentioned above, to extend tray 902 outside of the enclosure 901, at least one actuator 904 may be employed. In some exemplary embodiments, the actuator may be coupled to one terminal end of the enclosure 901 that is opposite the terminal end with the opening or tailgate end of the vehicle. Actuator 904 may thus extend and retract to, respectively, deploy the tray outside of enclosure 901 and then bring the tray back inside the enclosure 901.

Figure 18:
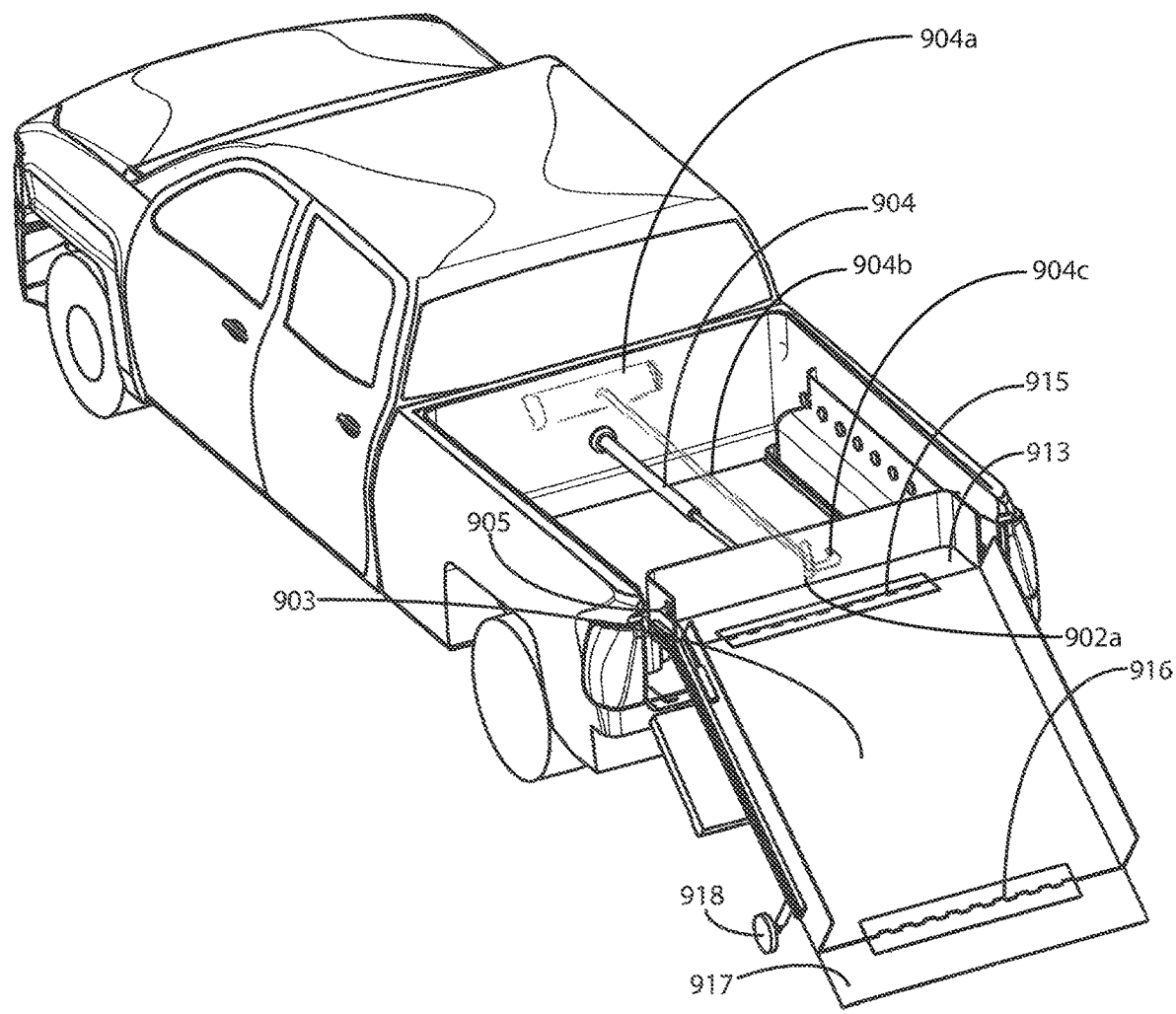

As mentioned above, deployable tray 902 may be configured so that it is tiltable and has a tiltable surface 903; tiltable surface 903 may be appreciated from the perspective view of the truck and cargo carrier 900 shown in FIG. 18.

Figure 19:
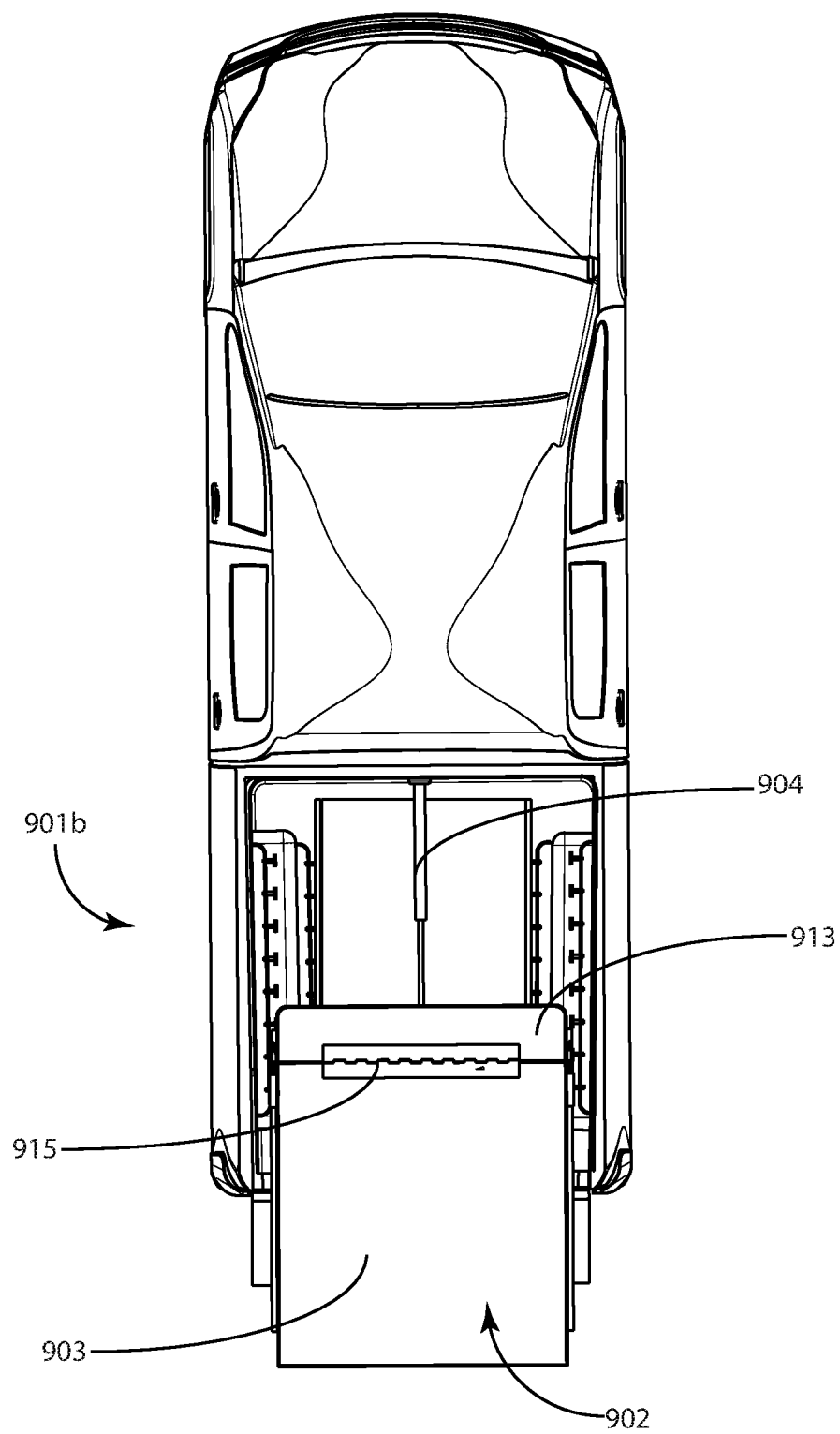

In FIG. 18, deployable tray 902 is shown including a static or stationary surface 913, and a tiltable surface 903 that is configured or adapted to tilt downward so that the deployable tray may be positioned in an inclined position with respect to its horizontal position of the stationary surface 913. This may be achieved via one or more hinges such as hinge 915 that couples stationary surface 9163 with tiltable surface 903. In some exemplary embodiments as will be discussed below, an actuator 905 may be coupled to a side surface of the deployable tray 902 and adapted to tilt the tiltable surface 903 of the deployable tray 902 by tilting or pivoting the tilting surface 903 about an axis of the hinge 915 that connects the static surface 913 with the tilting surface 903. As may be appreciated from this view, the lowering of deployable tray 902 may be further supported by a retraction (or lowering) of wheels 918. That is, in some exemplary embodiments, deployable wheels may be lengthened or shortened to support changing the position of deployable tray 902. As may also be gleaned from this view of FIG. 18, in some exemplary embodiments, deployable tray 902 may include a hatch or door 917 coupled to tiltable surface 903 of the tray 902, which may be deployed or opened to allow for easy loading or unloading of cargo. Moreover, and as shown in this view, in some exemplary embodiments, a device such as another actuator, or a winch 904*a* (as shown) may be attached to the back wall of the enclosure 901, which may preferably include a winch attachment plate embedded during the molding process. A winch cable 904*b* may be situated so that the winch cable 904*b* passes through a slot 902*a* in the back of the rear wall of the deployable tray 902. A hook 904*c* may be attached to the end of the cable 904*b* on the interior side of the deployable tray 902. The hook can be attached to wheeled equipment to facilitate pulling the equipment onto the tray when the tray is tilted to the ground. Once the center of gravity of the equipment crosses the center of gravity of the deployed tray, the actuator wheels may be extended to lift the tray to its level position, whereupon the tray actuator may be retracted to pull the tray back into the enclosure. The tray has guide wheels above and below the cable in order to facilitate the frictionless motion of the cable as the equipment is pulled by the winch cable onto the tiltable tray. FIG. 19, depicts each of these components from a top view, except that deployable hatch door 917 is in a closed state.

Figure 20:
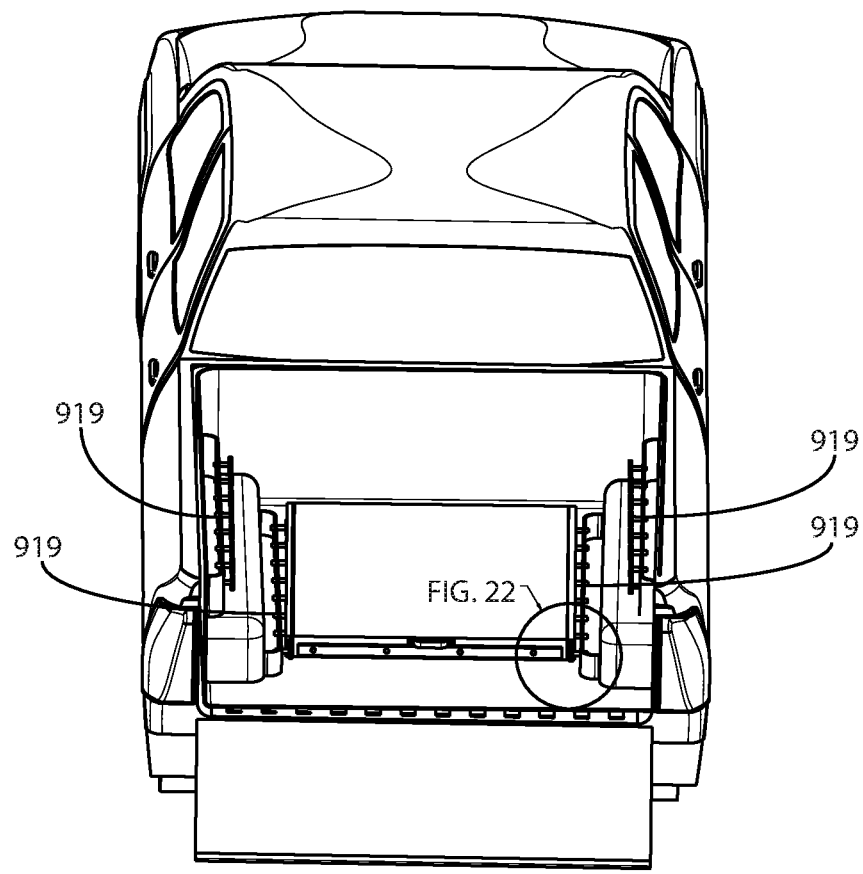
Figure 21:
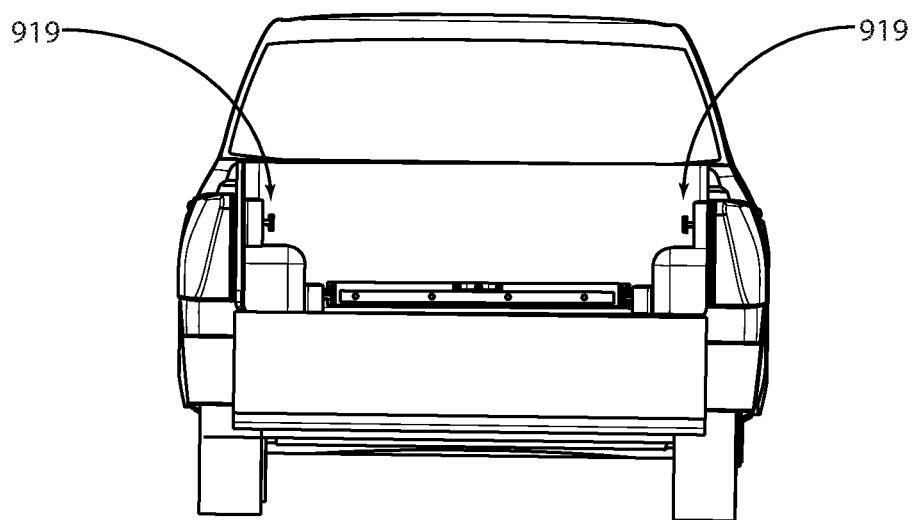

From each of the figures discussed above, it may be appreciated that in some exemplary embodiments there are several deployable trays within enclosure 901 that perform different functions. FIG. 20-FIG. 22 show how each tray may be attached to enclosure by support braces 919 that are molded into enclosure 901. The support braces 919 may be tracks including a series of roller bearings 920 on shafts that extend perpendicular to the support braces 919. The roller bearings 920 rest inside linear races 910 and 921 that are flush mounted to the exterior of each side of each tray (see also FIG. 9, FIG. 10, or FIG. 23), which supports their frictionless linear motion in and out of enclosure 901. The main tray 902 may be designed to support heavy loads. Tray 902 is automatically moved in and out of enclosure 901 by tray linear actuator 210, its base fixed to the front surface of enclosure 901 and its telescoping end attached to a fitting on the back end of the underside of the tray. FIG. 22 illustrates a close-up view of one exemplary means of coupling an exemplary and optional workbench component to the interior of the cargo carrier.

Figure 23:
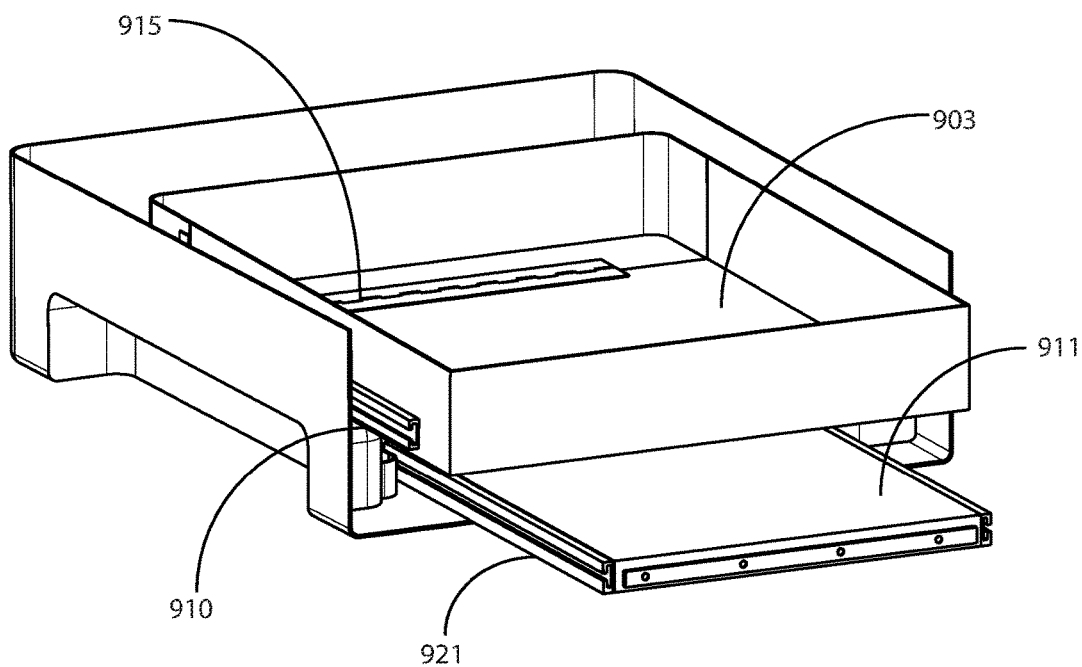
FIG. 23-26 illustrate a bottom shell portion of a cargo carrier in accordance with an exemplary embodiment of the present invention, which includes a retractable tray and an optional workbench.
Figure 24:
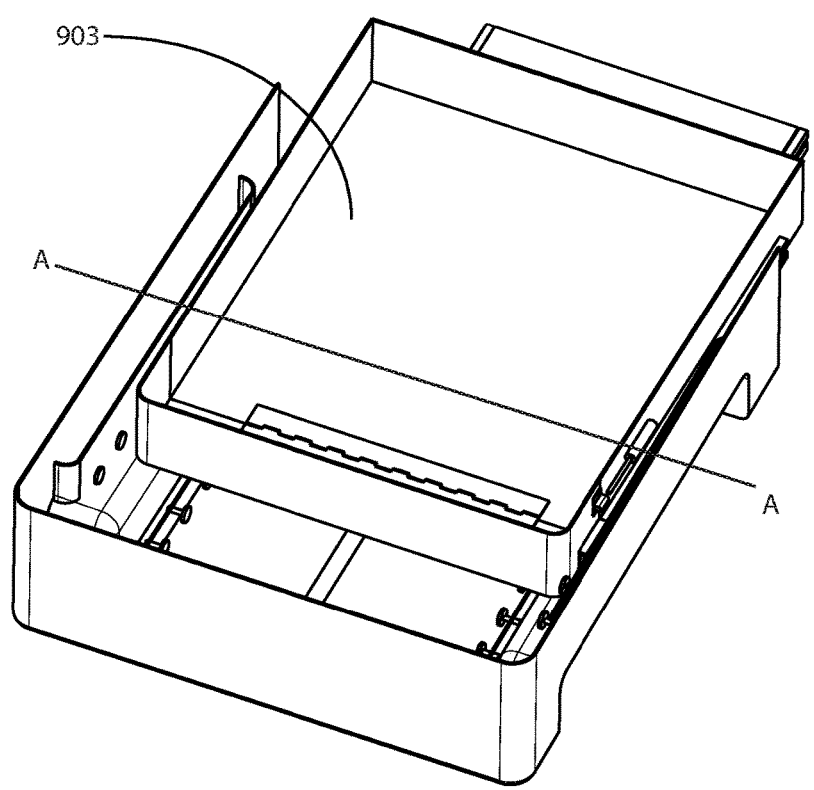
Figure 25:
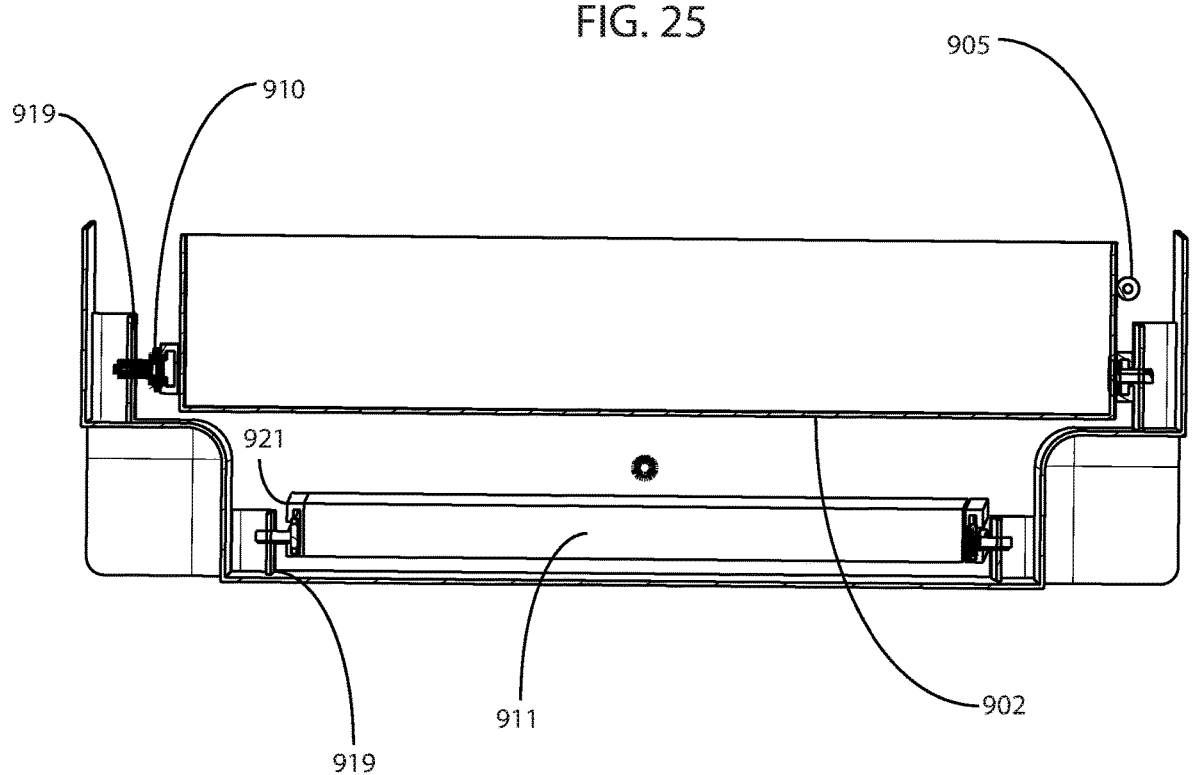
Figure 26:
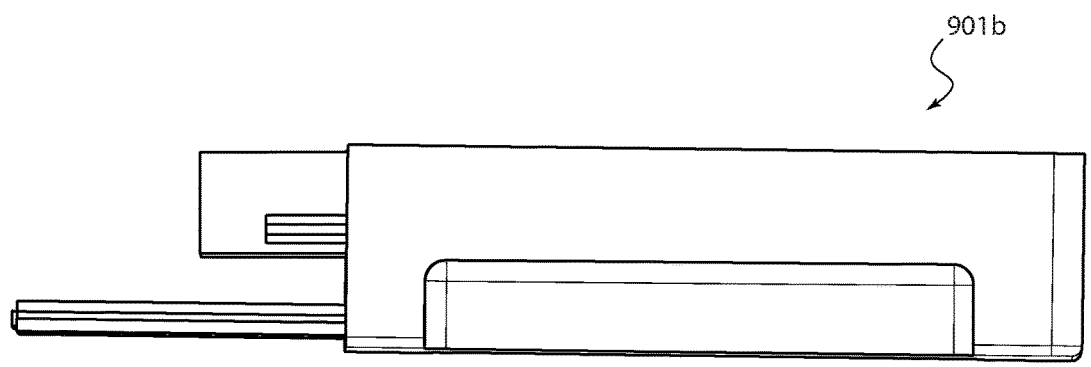
Figure 27:
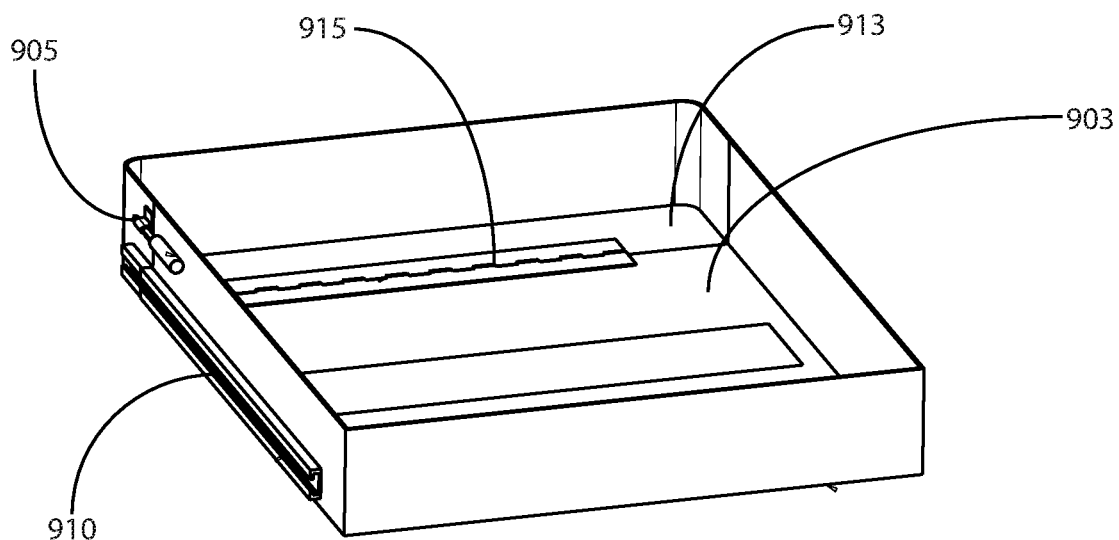
FIG. 27-30 illustrate an exemplary retractable tray for a cargo carrier in accordance with the present invention.
Figure 28:
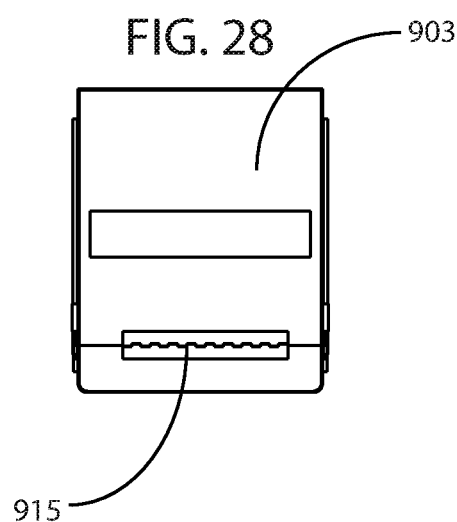
Figure 29:
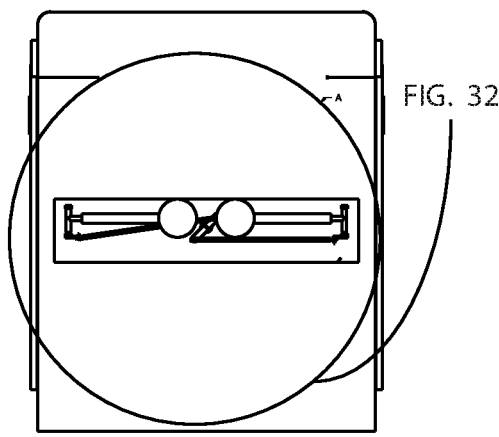
Figure 30:
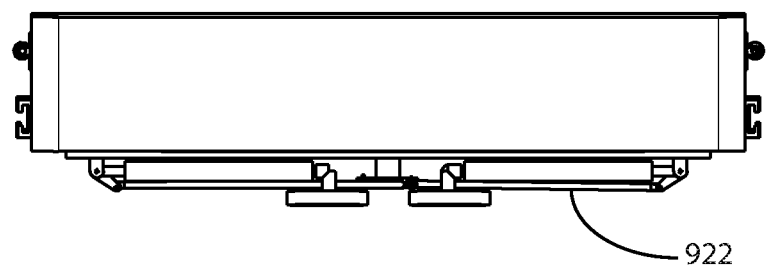
Figure 31:
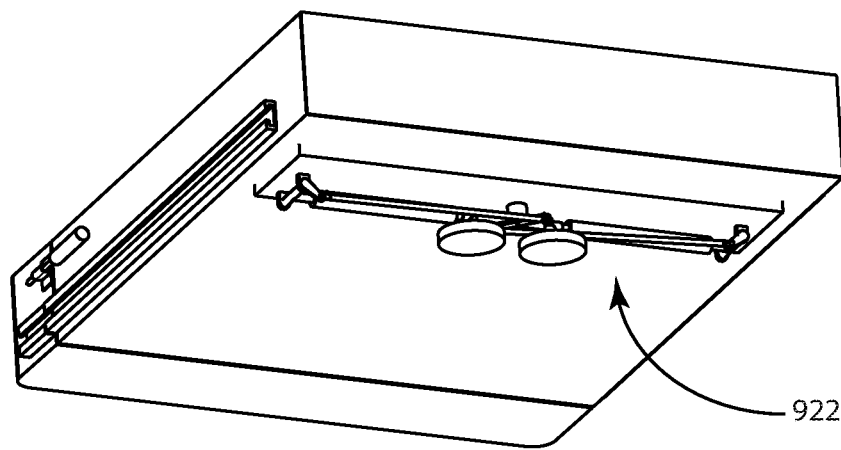
FIG. 31-42 illustrate various exemplary mechanisms of an exemplary retractable tray for a cargo carrier in accordance with the present invention, which allow the retractable tray to be positioned in multiple configurations.
Figure 32:
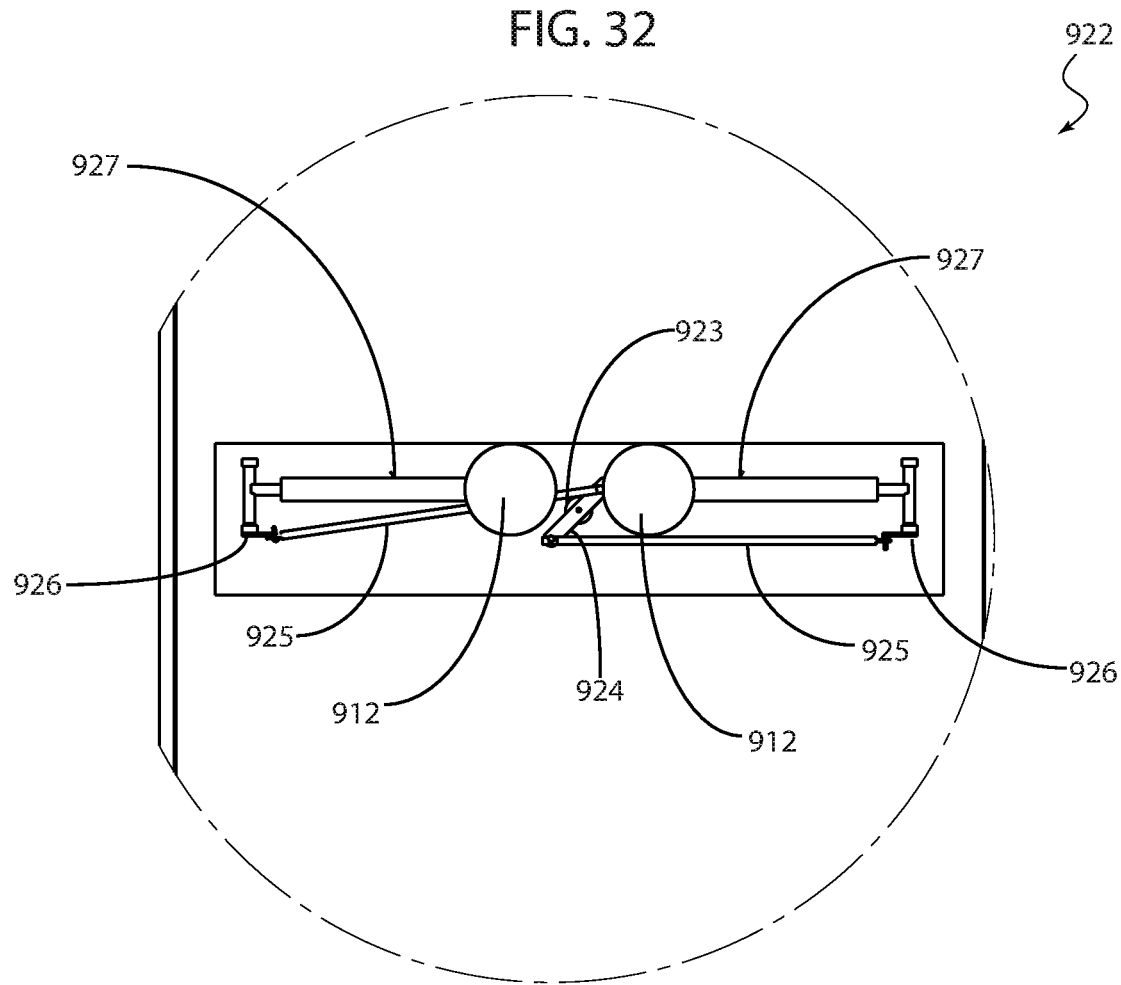
Figure 33:
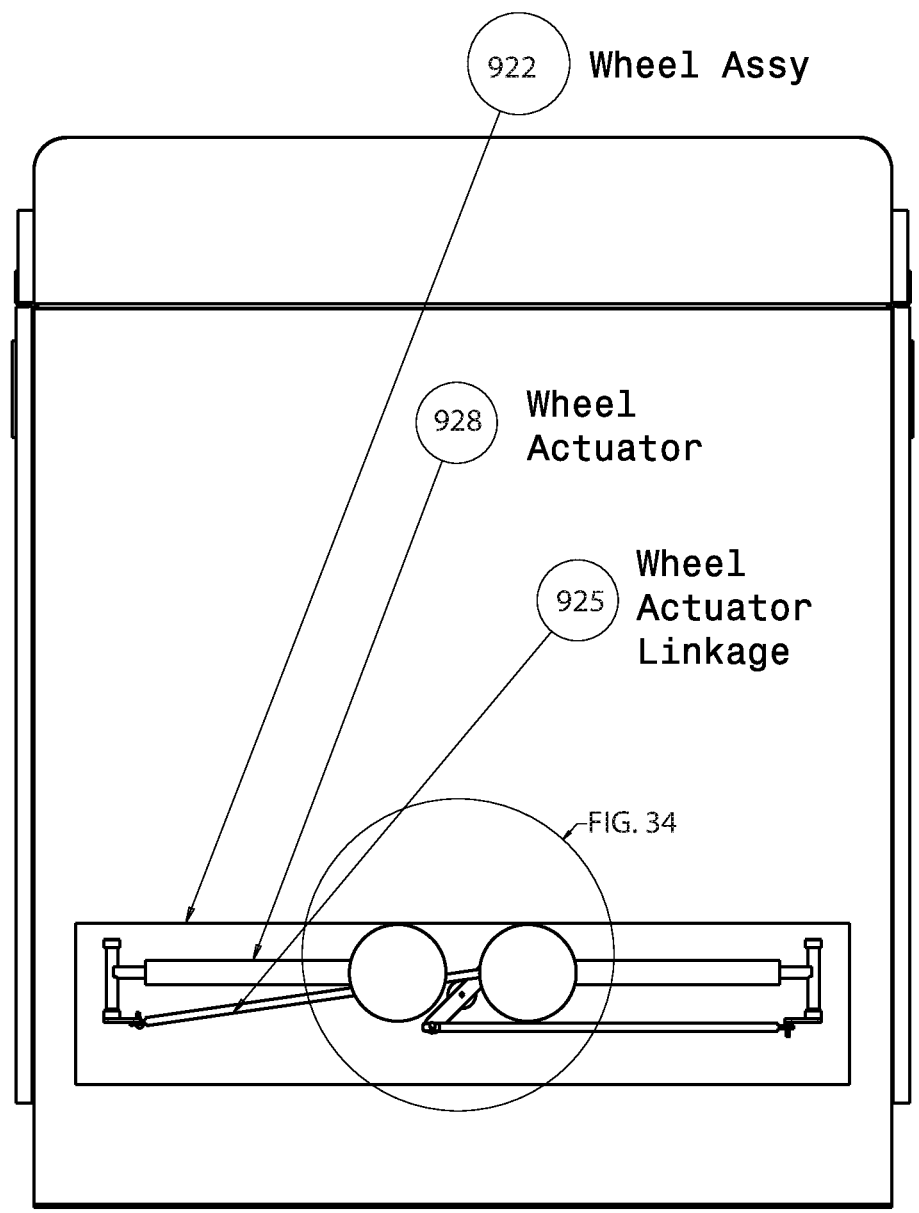
Figure 34:
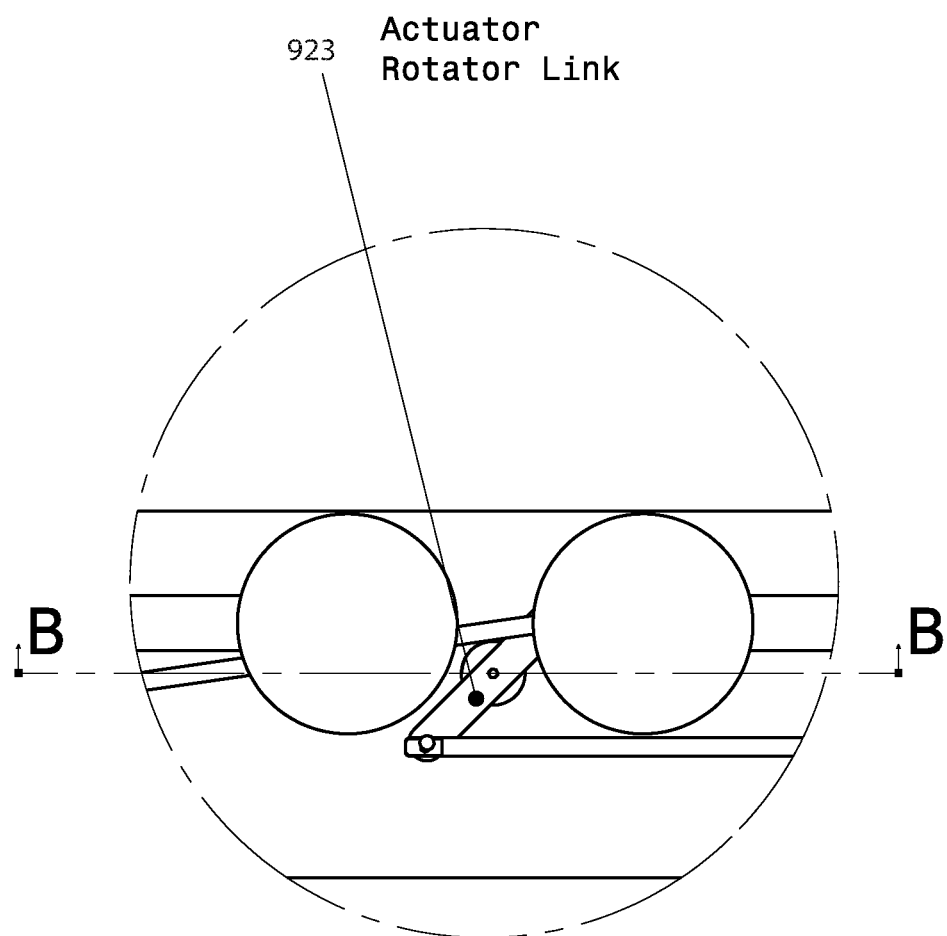
Figure 35:
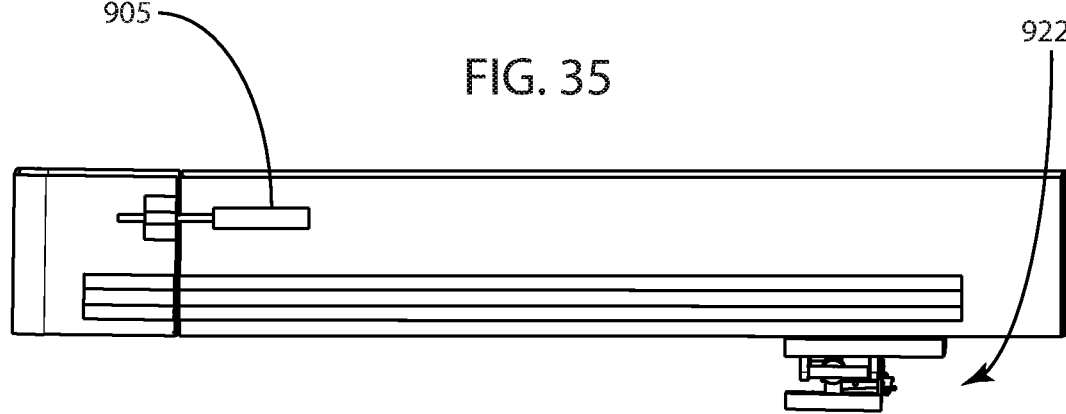
Figure 36:
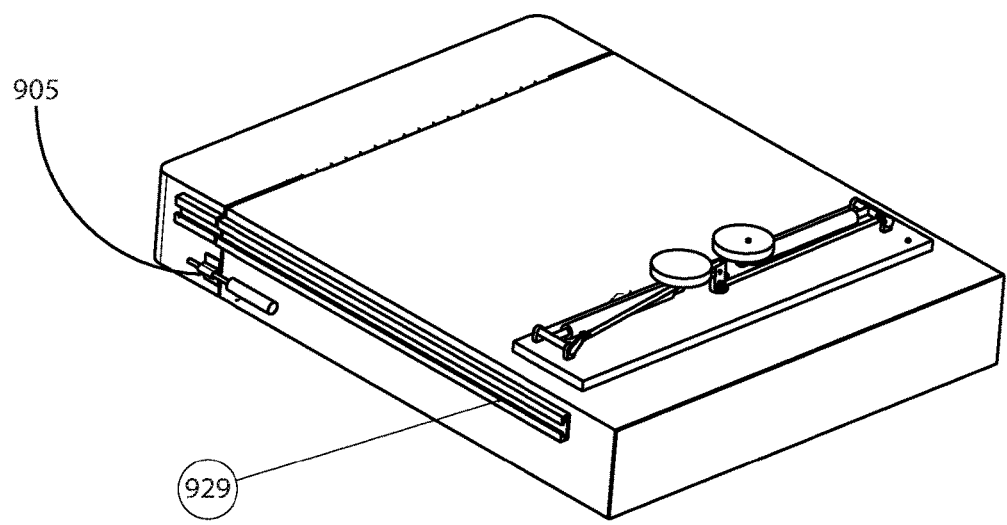
Figure 37:
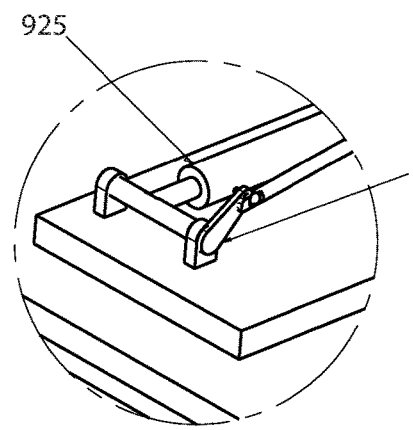
Figure 38:
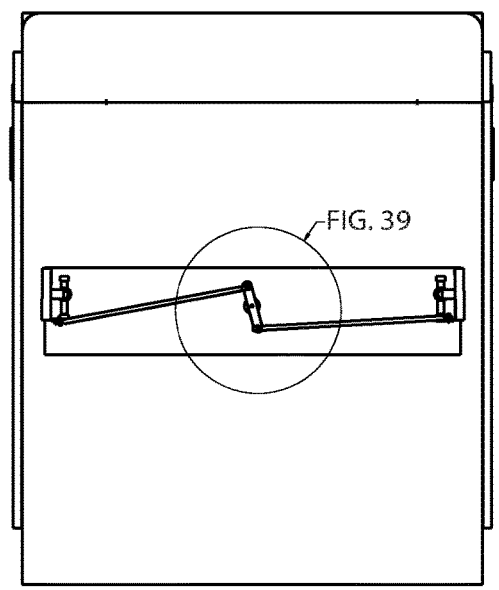
Figure 39:
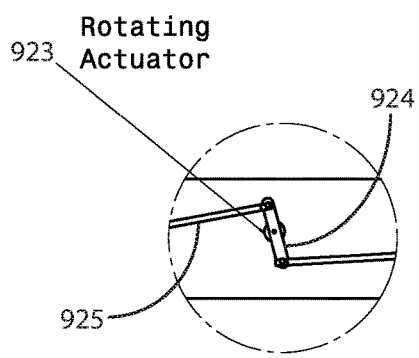
Figure 40:
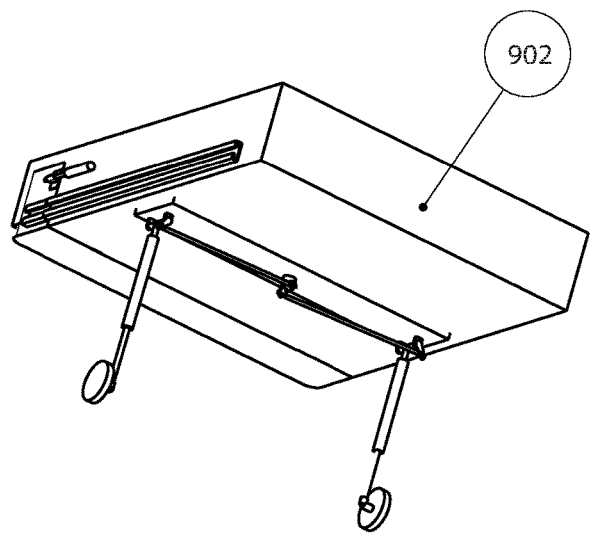
Figure 41:
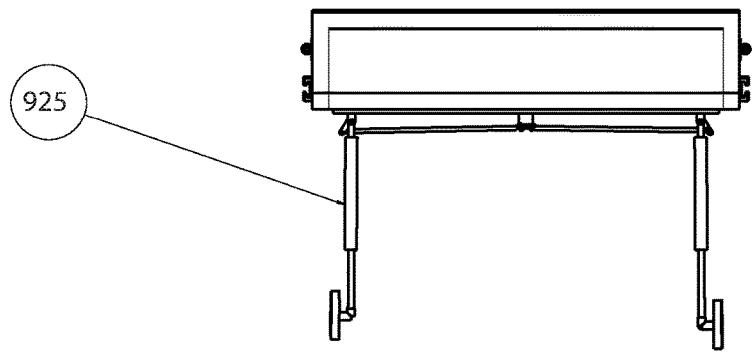
Figure 42:
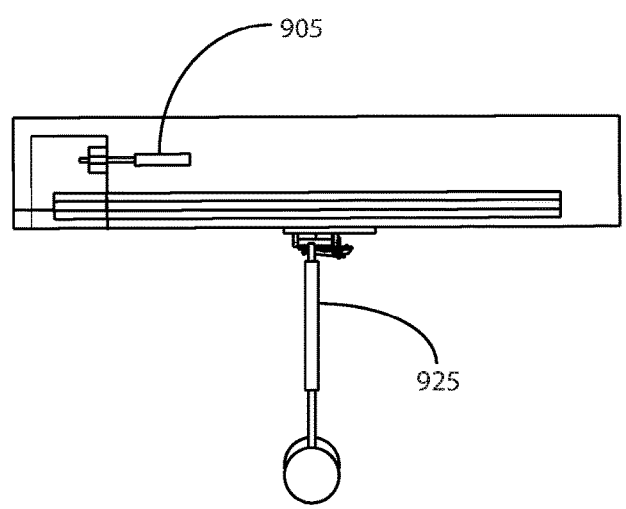

Turning now to the next set of figures, FIG. 23-25 illustrate the bottom shell portion of cargo carrier 900 in accordance with an exemplary embodiment of the present invention, which includes the retractable tray and optional workbench; FIG. 26 shows a sideview thereof; and FIG. 27-FIG. 30 illustrate exemplary features of the deployable tray or workbench 911.

The workbench 911 is an important feature of this invention because it provides a working surface for performing work tasks for construction and service vehicles on the job site. The workbench 911 is located near the bottom of the enclosure 901 below the main load tray assembly 902. The workbench tray 911 slides out of enclosure 901 in a similar fashion as the load tray 902. Although described earlier with reference to FIG. 13 as potentially actuator driven, in exemplary embodiments, workbench tray 911 may be operated manually, but may be automated by a mechanism similar to that described for the main tray, or numerous other mechanisms. Typically, workbench tray 911 is made of a lightweight window frame structure. The frame may include indented surfaces to allow for flush mounted plywood work panels. The frame may contain an array of threaded inserts equally spaced throughout the frame to allow for clamping of workpieces.

As mentioned above, a power strip 911b may be built into the front face of frame in order to supply electrical power for power tools. The power strip may be connected to an inverter in the back of enclosure 901. The workbench tray 911 may be manually pulled out via a handle on the front face of the frame.

Also mentioned above, and viewable in FIG. 29 workbench tray 911 may contain folding legs 922 to support the tray while extended in a similar fashion as shown in the main load tray assembly or might employ a more simple telescoping leg that manually folds down (not shown).

In some exemplary embodiments, as may be gleaned from FIG. 22A-FIG. 22B, a third tray may serve as a retractable awning 600 that is located near the top of enclosure 200. Like the workbench 500, it consists of a lightweight frame that is attached to enclosure 200 in a similar fashion as the workbench and moves in and out by a similar mechanism. In the preferred embodiment, it is operated manually, but may be automated by a mechanism similar to that described for the main tray 300, or numerous other mechanisms. Generally, tracks 601 and 602 may be coupled to interior walls of the enclosure 200 (for example near the top region and in proximity to a top surface of enclosure 200) in order to provide a slidable awning that may be slidably retracted and deployed to provide shade.

FIG. 31-42 illustrate various exemplary mechanisms of an exemplary retractable tray for a cargo carrier in accordance with the present invention, which allow the retractable tray to be positioned in multiple configurations.

Tray 901 may include folded telescoping wheel system 922 attached to the underside of its front section. As tray 901 extends sufficiently past the exterior of enclosure 901, as determined by a Hall's Effect switch connected to a controller, rotary actuator 923 rotates a rotator arm 924 which is attached to linear rotator link 925 which is in turn attached at its other end to rotator cam 926 which rotates the leg 924 of the two wheels 912 towards the ground. Each leg 927 contains an in-line linear actuator 928 which extends each leg 927 until it reaches the ground as detected by ultrasonic sensors attached to the actuated ends of actuators. Tray 902 may also have a mercury switch located along and parallel to the base of the tray 902, which is connected to the controller that controls the in-line actuators 928, thereby allowing the tray to maintain a level attitude on uneven ground.

Another important feature (in some exemplary embodiments) is the ability to tilt the extended tray to the ground in order to easily load heavy, wheeled equipment into the enclosure. In the current embodiment, this is achieved splitting tray 902 into two segments across its width. The fixed (aft) segment or stationary surface 913 and a tiltable (forward) segment or tiltable surface 903 are connected by a hinge 915, which may be a piano hinge that spans the width of the floor of the two tray segments or surfaces. The folded telescoping actuated wheel assembly 922 may be attached to the underside of the tiltable surface 903. The two tray segments 913 and 903 are secured in an un-tilted position by two deadbolts 929 that may be located on the exterior sides of tray 902 and span the gap between the fixed segment 913 and the tiltable segment 903. When the tray 902 is extended from the enclosure 901 and the wheel assembly 922 has been extended as previously described, the tiltable portion of the tray may be lowered to the ground by retracting the deadbolts 929 and retracting the leg actuators 928. The front face of tiltable tray segment 903 is also hinged to allow it to fold down and serve as a ramp. The process may be further automated by connecting linear actuators to the deadbolts 929, bringing the entire process of extending the tray, extending the legs until the wheels touch the ground, and then tilting the tray down the ground under controlled automation.

A cargo carrier including an automated self-loading cargo carrier for automobiles has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A cargo carrier, comprising:
   an enclosure including fittings configured to couple the enclosure to a truck bed;
   a first deployable tray, slidably housed within the enclosure, the first deployable tray including a tiltable surface and a door at a terminal end of the first deployable tray for facilitating loading or unloading of the first deployable tray;
   one or more actuators, including:
      at least one actuator adapted to extend and retract the first deployable tray outside and inside the enclosure, respectively; and
      at least one actuator adapted to tilt the tiltable surface of the first deployable tray; and
   a controller in communication with the one or more actuators and configured to:
      activate the one or lore actuators to slide the first deployable tray outside of the enclosure; and
      activate the one or more actuators to tilt the tiltable surface of the first deployable tray.

2. The cargo carrier of claim 1, further comprising a second deployable tray.

3. The cargo carrier of claim 2, wherein the enclosure further includes:
a first set of tracks adapted to receive a first set of complementary tracks of the first deployable tray; and
a first second of tracks adapted to receive a second set of complementary tracks of the second deployable tray, wherein the second deployable tray is situated below the first deployable tray.

4. The cargo carrier of claim 3, wherein the deployable tray includes a power supply access.

5. The cargo carrier of claim 1, wherein the first deployable tray further includes a pair of deployable wheels configured to support the first deployable tray in an extended position.

6. The cargo carrier of claim 1, wherein the first deployable tray further includes a hinge connecting the tiltable surface to a stationary surface.

7. The cargo carrier of claim 6, wherein hinge connecting the tiltable surface to a stationary surface of the first deployable tray is situated closer to a terminal end of the first deployable tray than to an opposite terminal end.

8. The cargo carrier of claim 6, wherein the tiltable surface of the first deployable tray includes a greater surface area than the stationary surface of the first deployable tray.

9. The cargo carrier of claim 1, wherein the controller employs a receiver or transceiver for communicating with a remote control, the remote control configured to control activation of the first deployable tray.

10. The cargo carrier of claim 1, wherein the controller comprises a programmable memory configured to store one or more programmable deployable tray positions.

11. The cargo carrier of claim 1, wherein the controller is adapted to draw power from a rechargeable battery housed within the enclosure.

12. The cargo carrier of claim 11, further comprising photovoltaic cells exposed on an exterior surface of the enclosure and coupled to the rechargeable battery.

13. The cargo carrier of claim 1, wherein the enclosure is a single-piece molded enclosure.

14. A cargo carrier, comprising:
a single-piece molded enclosure defined by a front wall, side walls, a top surface, a bottom surface and a rear access door opposite to the front wall of the enclosure, the enclosure further including fittings configured to couple the enclosure to a truck bed;
a first deployable tray, slidably housed within the enclosure, the first deployable tray including a tiltable surface;
one or more actuators, including:
at least one actuator housed inside the enclosure adapted to extend and retract the first deployable tray outside and inside the enclosure, respectively; and
at least one actuator coupled to a surface of the first deployable tray and adapted to tilt the tiltable surface of the first deployable tray; and
a controller in communication with the one or more actuators, the controller configured to:
activate the one or more actuators to slide the first deployable tray outside of the enclosure; and
activate the one or more actuators to tilt the tiltable surface of the first deployable tray.

15. The cargo carrier of claim 14, wherein the controller employs a receiver or transceiver for communicating with a remote control, the remote control configured to control activation of the enclosure.

16. The cargo carrier of claim 14, wherein the controller comprises a programmable memory configured to store one or more programmable deployable tray positions.

17. The cargo carrier of claim 14, further comprising photovoltaic cells exposed on an exterior surface of the enclosure and coupled to the rechargeable battery.

18. The cargo carrier of claim 14, wherein the first deployable tray further includes a pair of deployable wheels configured to support the first deployable tray in an extended position.

19. A cargo carrier, comprising:
an enclosure including fittings configured to couple the enclosure to a truck bed;
a first deployable tray, slidably housed within the enclosure, the first deployable tray including a tiltable surface;
one or more actuators, including:
at least one actuator adapted to extend and retract the first deployable tray outside and inside the enclosure, respectively; and
at least one actuator adapted to tilt the tiltable surface of the first deployable tray; and
a controller adapted to draw power from a rechargeable battery housed within the enclosure in communication with the one or more actuators and configured to:
activate the one or more actuators to slide the first deployable tray outside of the enclosure; and
activate the one or more actuators to tilt tires tiltable surface of the first deployable tray.

20. The cargo carrier of claim 19, wherein the first deployable tray further includes a pair of deployable wheels configured to support the first deployable tray in an extended position.

* * * * *